US012489942B2

(12) United States Patent
Boyd et al.

(10) Patent No.: US 12,489,942 B2
(45) Date of Patent: Dec. 2, 2025

(54) SHARING OF CONTENT COLLECTIONS

(71) Applicant: Snap Inc., Santa Monica, CA (US)

(72) Inventors: Nathan Kenneth Boyd, Los Angeles, CA (US); Christie Marie Heikkinen, Sherman Oaks, CA (US); Hao Long, Playa Vista, CA (US); Daniel Moreno, New York, NY (US); Daniel Rakhamimov, Brooklyn, NY (US); Suraya Shivji, New York, NY (US); Neil Tagare, New York, NY (US)

(73) Assignee: SNAP INC., Santa Monica, CA (US)

( * ) Notice: Subject to any disclaimer, the term of this patent is extended or adjusted under 35 U.S.C. 154(b) by 0 days.

(21) Appl. No.: 18/302,564

(22) Filed: Apr. 18, 2023

(65) Prior Publication Data
US 2024/0357197 A1 Oct. 24, 2024

(51) Int. Cl.
G06F 15/16 (2006.01)
H04L 51/10 (2022.01)
H04N 21/262 (2011.01)
H04N 21/433 (2011.01)

(52) U.S. Cl.
CPC ......... *H04N 21/4332* (2013.01); *H04L 51/10* (2013.01); *H04N 21/26241* (2013.01)

(58) Field of Classification Search
CPC .......... H04N 21/4332; H04N 21/26241; H04L 51/10
See application file for complete search history.

(56) References Cited

U.S. PATENT DOCUMENTS

| 8,214,446 B1* | 7/2012 | Siegel ............... H04L 51/00 713/168 |
| 10,628,392 B1* | 4/2020 | Charytoniuk ......... G06F 16/906 |
| 10,693,819 B1 | 6/2020 | Boyd et al. |
| 2016/0283099 A1* | 9/2016 | DeFusco ............... G11B 27/34 |

(Continued)

FOREIGN PATENT DOCUMENTS

WO WO-2024220513 A1 10/2024

OTHER PUBLICATIONS

"International Application Serial No. PCT/US2024/024954, International Search Report mailed Aug. 13, 2024", 3 pgs.

(Continued)

*Primary Examiner* — Duyen M Doan
(74) *Attorney, Agent, or Firm* — SCHWEGMAN LUNDBERG & WOESSNER, P.A.

(57) ABSTRACT

Aspects of the present disclosure involve a system comprising a storage medium storing a program and method for rule-based sharing of content collections. The program and method provide for storing, in association with each content collection, a set of rules with first criteria for adding a content item to the content collection, and with second criteria for viewing the content collection; determining, for a first content collection, that the respective first criteria is met for a first user of a first device; providing, based on the determining, for the first user to generate the content item; adding the generated content item to the first content collection; determining, for the first content collection, that the respective second criteria is met for a second user of a second device; and providing, based on the determining, the first content collection to the second device for viewing by the second user.

21 Claims, 21 Drawing Sheets

(56) References Cited

U.S. PATENT DOCUMENTS

| | | | |
|---|---|---|---|
| 2017/0371499 A1* | 12/2017 | Checkley | H04L 63/0442 |
| 2018/0034818 A1* | 2/2018 | Choi | G06F 3/04817 |
| 2019/0087410 A1* | 3/2019 | Dimson | G06F 3/0488 |
| 2019/0098360 A1* | 3/2019 | Keeney | H04N 21/23439 |
| 2020/0045003 A1* | 2/2020 | Fried | H04L 51/42 |
| 2021/0097745 A1 | 4/2021 | Monroy-Hernandez et al. | |
| 2021/0367914 A1 | 11/2021 | Collins et al. | |
| 2022/0207838 A1 | 6/2022 | Anvaripour et al. | |
| 2022/0414969 A1* | 12/2022 | Archer, III | H04L 51/10 |
| 2025/0133270 A1* | 4/2025 | Edwards | G06F 40/30 |

OTHER PUBLICATIONS

"International Application Serial No. PCT/US2024/024954, Written Opinion mailed Aug. 13, 2024", 8 pgs.

"Surprise!", [Online] Retrieved from the Internet: <URL: https://www.snap.com/en-US/news/post/surprise>, (Oct. 3, 2013), 1 pg.

Buscemi, Scott, "Snapchat introduces 'Stories', a narrative built with snaps", [Online] Retrieved from the Internet: <URL: https://9to5mac.com/2013/10/03/snapchat-introduces-stories-a-narrative-built-with-snaps/>, (Oct. 3, 2013), 2 pgs.

Etherington, Darrell, "Snapchat Gets Its Own Timeline With Snapchat Stories, 24-Hour Photo & Video Tales", [Online] Retrieved from the Internet: <URL:https://techcrunch.com/2013/10/03/snapchat-gets-its-own-timeline-with-snapchat-stories-24-hour-photo-video-tales/>, (Oct. 3, 2013), 2 pgs.

Hamburger, Ellis, "Snapchat's next big thing: 'Stories' that don't just disappear", [Online] Retrieved from the Internet: <URL: https://www.theverge.com/2013/10/3/4791934/snapchats-next-big-thing-stories-that-dont-just-disappear>, (Oct. 3, 2013), 5 pgs.

* cited by examiner

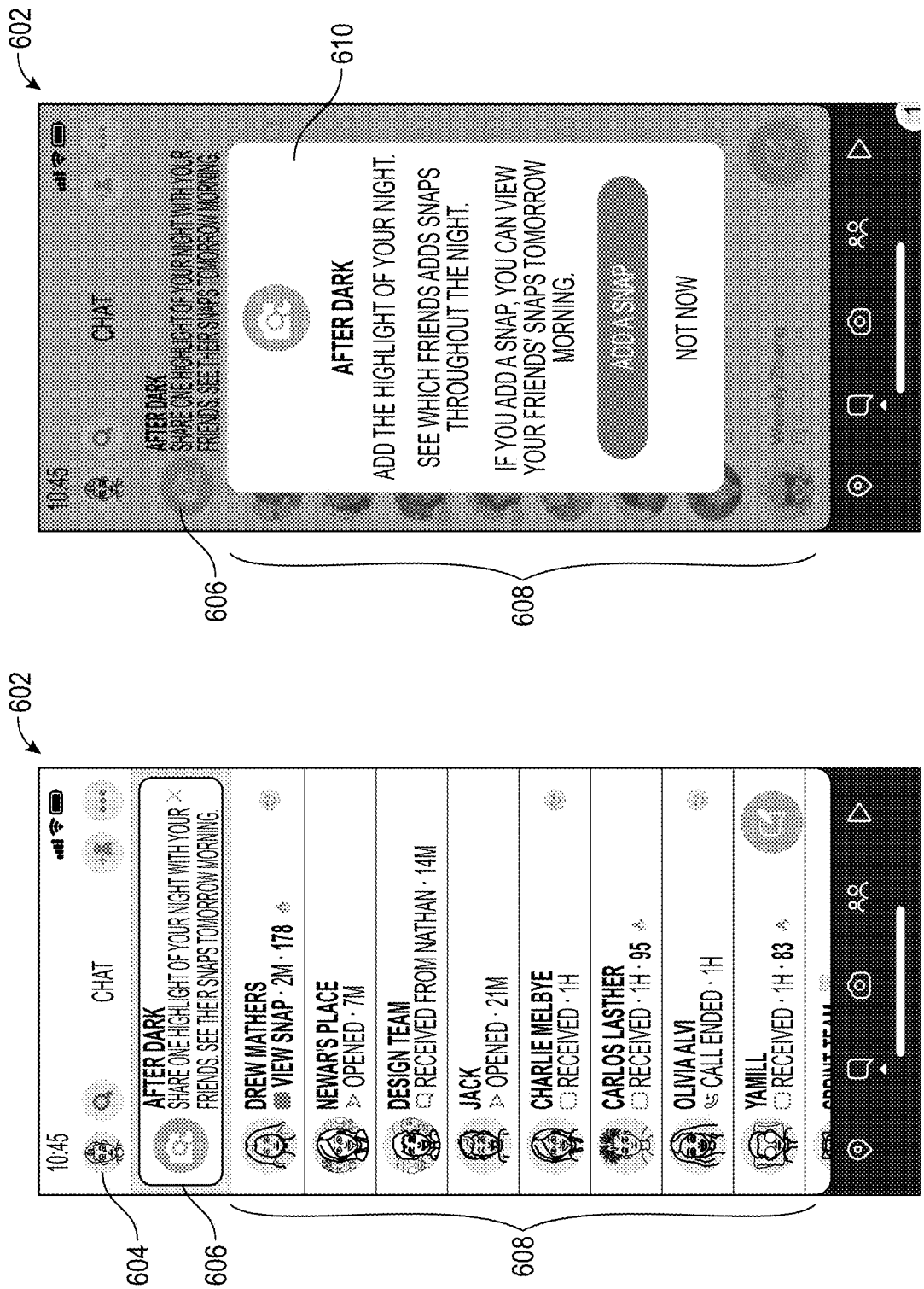

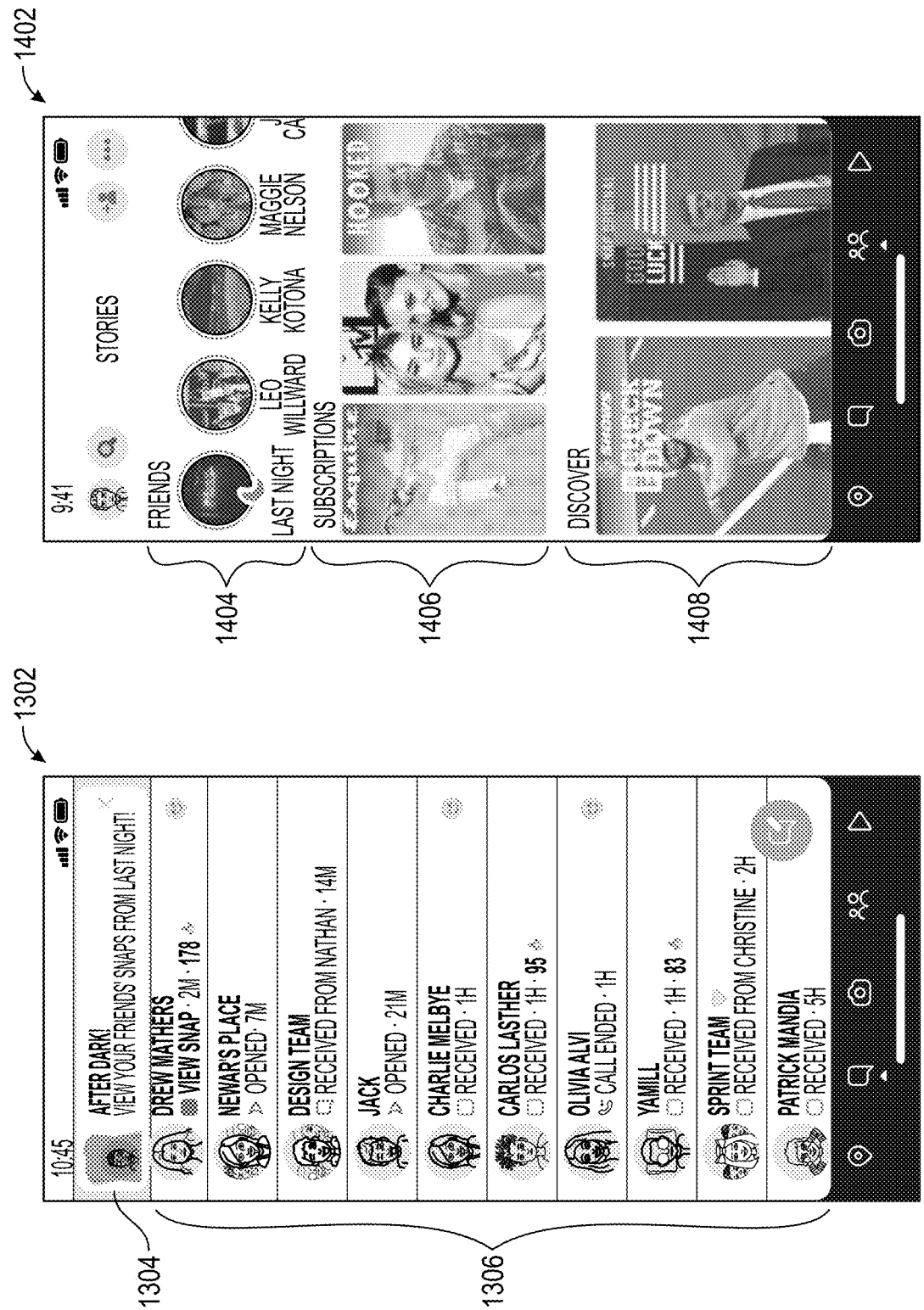

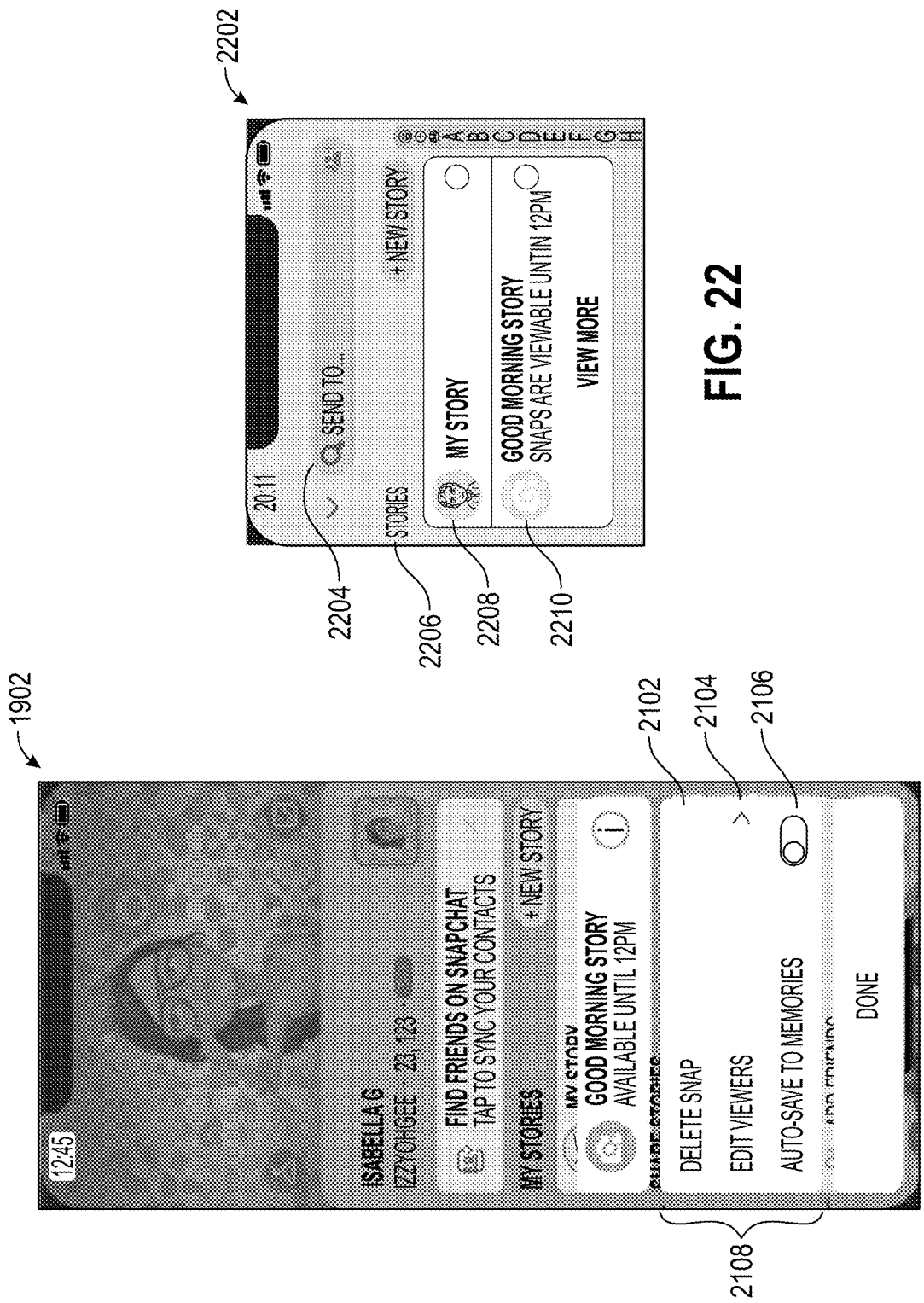

SHARING OF CONTENT COLLECTIONS

BACKGROUND

Systems such as messaging systems provide for the exchange of message content between users. For example, such systems allow users to exchange message content (e.g., text, video, pictures) between each other.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which:

FIGS. 6A-6B illustrate a chat interface prompting a user to add a content item to a content collection with late night content ("an after dark content collection"), in accordance with some examples.

FIG. 8 illustrates a chat interface confirming the addition of a content item to an after dark content collection, in accordance with some examples.

FIG. 9 illustrates a personal profile interface confirming the addition of a content item to an after dark content collection, in accordance with some examples.

FIG. 13 illustrates a chat interface indicating that an after dark content collection is available for viewing, in accordance with some examples.

FIG. 14 illustrates a content feeds interface indicating that an after dark content collection is available for viewing, in accordance with some examples.

FIGS. 15A-15C illustrates a playback interface for viewing an after dark content collection, in accordance with some examples.

FIG. 21 illustrates a menu interface for deleting an added content item and updating the users associated with a good morning content collection, in accordance with some examples.

FIG. 22 illustrates a send to interface for adding a generated content item to a good morning content collection, in accordance with some examples.

DETAILED DESCRIPTION

Systems such as messaging systems typically allow users to exchange media content items (e.g., messages, images and/or video) with one another. As described herein, the system provides for a user to capture video, and for the user to customize interface elements that are displayed during video recording.

The disclosed embodiments relate to a system configured to store rules in association with particular types of content collections (e.g., stories). For each type of content collection, the rules specify one or more of: time periods (e.g., time of day, day(s) of the week) for contributing to and/or viewing the content collection; a required geolocation for contributing to the content collection; a required type of content for contributing to the content collection; required user profile attribute(s) for contributing to and/or viewing the content collection; and/or which users (e.g., preselected contacts, directs contacts, or contacts of direct contacts) are permitted to view the content collection. Based on the stored rules for each type of content collection, the system causes the device of an end user to display various interface elements to the end user, thereby prompting the end user to contribute and/or view the content collection.

By virtue of the foregoing, the system provides for increased user engagement with respect to contributing to and/or viewing content collections. Moreover, the system facilitates user interaction, for example, by prompting and otherwise notifying users of a particular content collection, based on the rules associated therewith. The system facilitates the creation of content collections for sharing between contacts, thereby saving time for the user, and reducing computational resources/processing power for the system.

Networked Computing Environment

Figure 1:
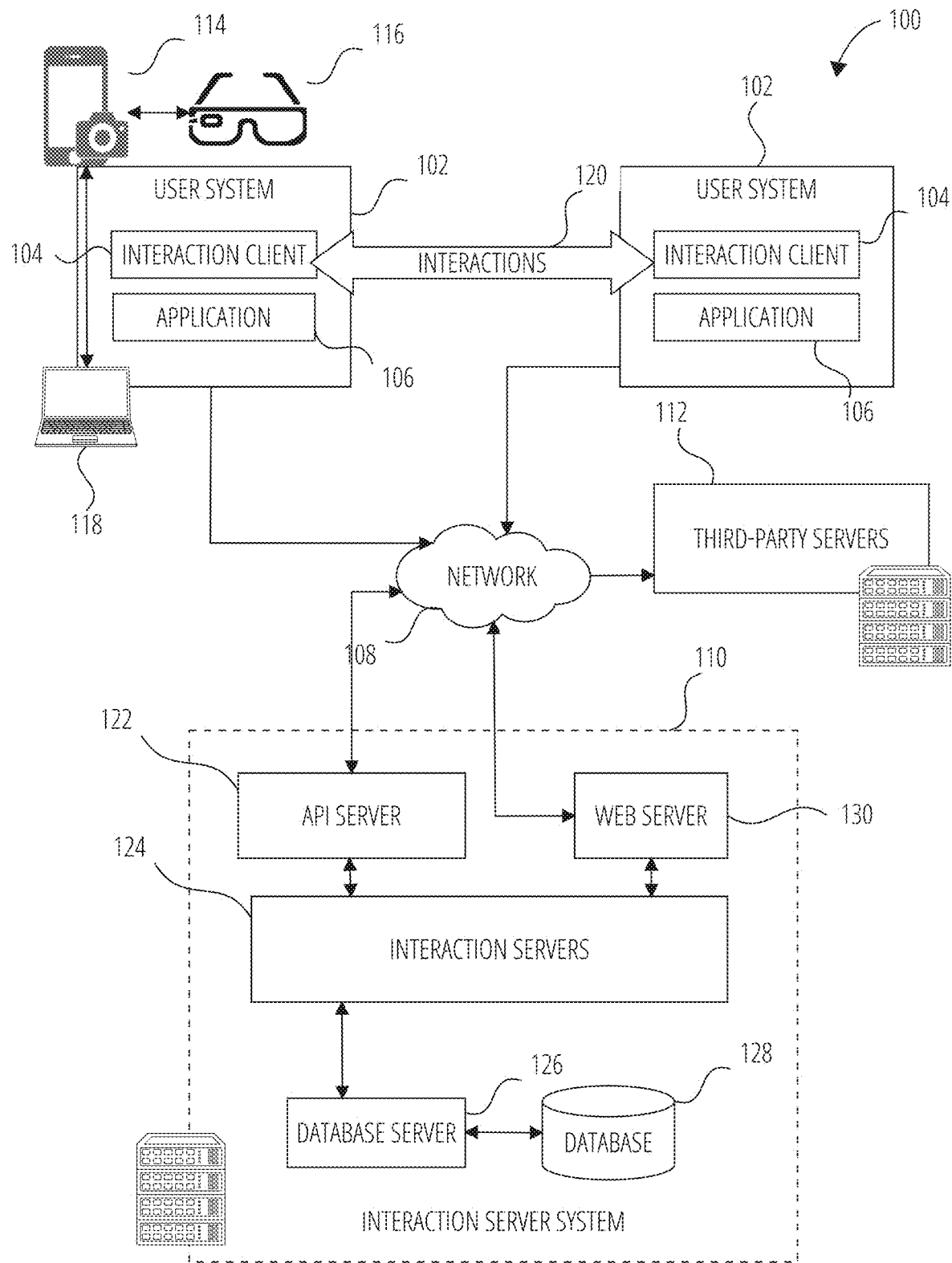
FIG. 1 is a diagrammatic representation of a networked environment in which the present disclosure may be deployed, according to some examples.

FIG. 1 is a block diagram showing an example interaction system 100 for facilitating interactions (e.g., exchanging text messages, conducting text audio and video calls, or playing games) over a network. The interaction system 100 includes multiple user systems 102, each of which hosts multiple applications, including an interaction client 104 and other applications 106. Each interaction client 104 is communicatively coupled, via one or more communication networks including a network 108 (e.g., the Internet), to other instances of the interaction client 104 (e.g., hosted on respective other user systems 102), an interaction server system 110 and third-party servers 112). An interaction client 104 can also communicate with locally hosted applications 106 using Applications Program Interfaces (APIs).

Each user system 102 may include multiple user devices, such as a mobile device 114, head-wearable apparatus 116, and a computer client device 118 that are communicatively connected to exchange data and messages.

An interaction client 104 interacts with other interaction clients 104 and with the interaction server system 110 via the network 108. The data exchanged between the interaction clients 104 (e.g., interactions 120) and between the interaction clients 104 and the interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, client device information, geolocation information, media augmentation and overlays, message content persistence conditions, entity relationship information, and live event information. Data exchanges within the interaction system 100 are invoked and controlled through functions available via user interfaces (UIs) of the interaction clients 104.

Turning now specifically to the interaction server system 110, an Application Program Interface (API) server 122 is coupled to and provides programmatic interfaces to interaction servers 124, making the functions of the interaction servers 124 accessible to interaction clients 104, other applications 106 and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over the Hypertext Transfer Protocol (HTTP) and several other related protocols.

The Application Program Interface (API) server 122 receives and transmits interaction data (e.g., commands and message payloads) between the interaction servers 124 and the user systems 102 (and, for example, interaction clients 104 and other application 106) and the third-party server 112. Specifically, the Application Program Interface (API) server 122 provides a set of interfaces (e.g., routines and protocols) that can be called or queried by the interaction client 104 and other applications 106 to invoke functionality of the interaction servers 124. The Application Program Interface (API) server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a user system 102; the retrieval of messages and content; the addition and deletion of entities (e.g., friends) to an entity relationship graph (e.g., the entity graph 310); the location of friends within an entity relationship graph; and opening an application event (e.g., relating to the interaction client 104).

The interaction servers 124 host multiple systems and subsystems, described below with reference to FIG. 2.

System Architecture

Figure 2:
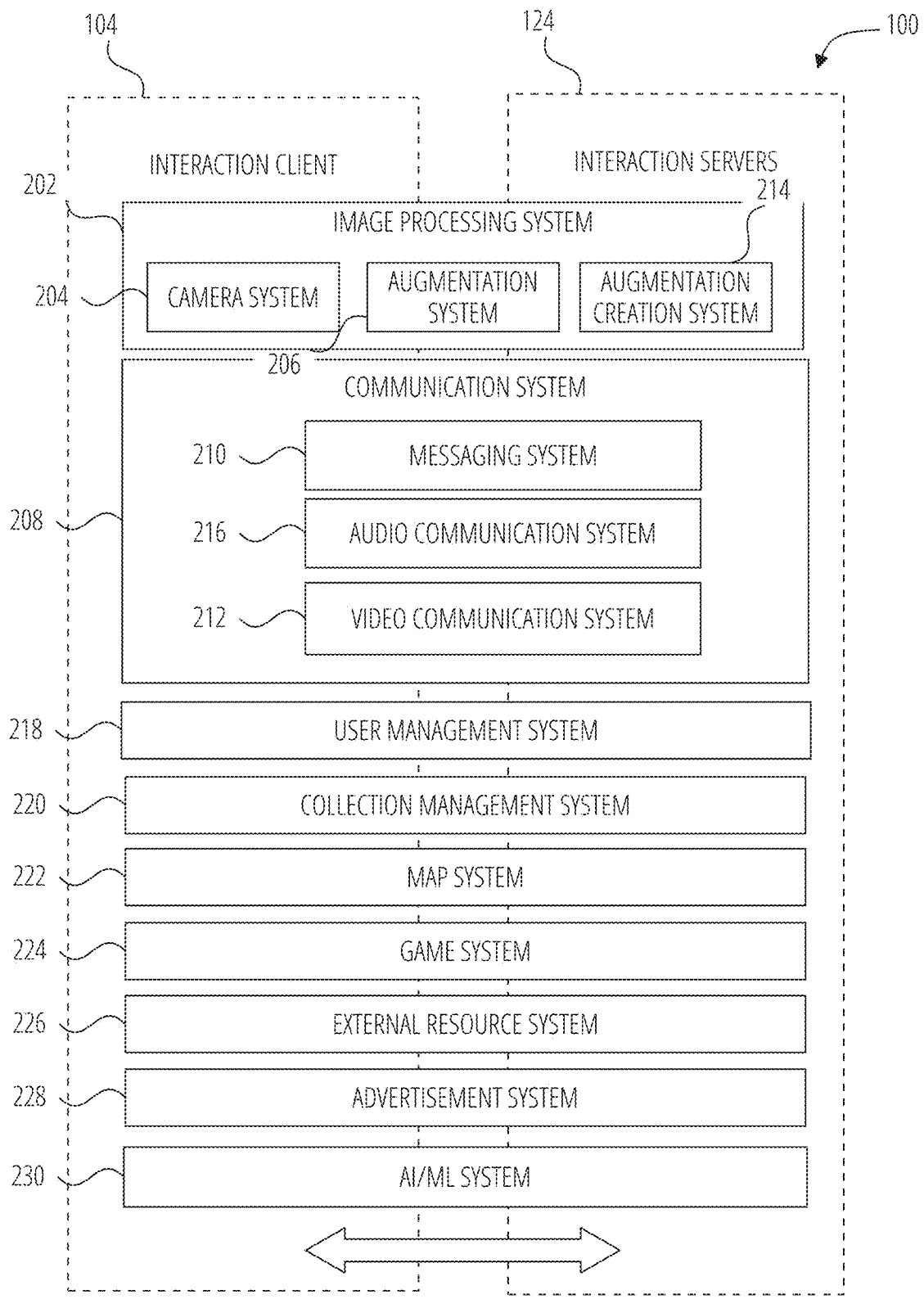
FIG. 2 is a diagrammatic representation of a messaging system that has both client-side and server-side functionality, according to some examples.

FIG. 2 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124. In some examples, these subsystems are implemented as microservices. A microservice subsystem (e.g., a microservice application) may have components that enable it to operate independently and communicate with other services. Example components of microservice subsystem may include:

Function logic: The function logic implements the functionality of the microservice subsystem, representing a specific capability or function that the microservice provides.

API interface: Microservices may communicate with each other components through well-defined APIs or interfaces, using lightweight protocols such as REST or messaging. The API interface defines the inputs and outputs of the microservice subsystem and how it interacts with other microservice subsystems of the interaction system 100.

Data storage: A microservice subsystem may be responsible for its own data storage, which may be in the form of a database, cache, or other storage mechanism (e.g., using the database server 126 and database 128). This enables a microservice subsystem to operate independently of other microservices of the interaction system 100.

Service discovery: Microservice subsystems may find and communicate with other microservice subsystems of the interaction system 100. Service discovery mechanisms enable microservice subsystems to locate and communicate with other microservice subsystems in a scalable and efficient way.

Monitoring and logging: Microservice subsystems may need to be monitored and logged in order to ensure availability and performance. Monitoring and logging mechanisms enable the tracking of health and performance of a microservice subsystem.

In some examples, the interaction system 100 may employ a monolithic architecture, a service-oriented architecture (SOA), a function-as-a-service (FaaS) architecture, or a modular architecture:

Example subsystems are discussed below.

An image processing system 202 provides various functions that enable a user to capture and augment (e.g., annotate or otherwise modify or edit) media content associated with a message.

A camera system 204 includes control software (e.g., in a camera application) that interacts with and controls hardware camera hardware (e.g., directly or via operating system controls) of the user system 102 to modify and augment real-time images captured and displayed via the interaction client 104.

The augmentation system 206 provides functions related to the generation and publishing of augmentations (e.g., media overlays) for images captured in real-time by cameras of the user system 102 or retrieved from memory of the user system 102. For example, the augmentation system 206 operatively selects, presents, and displays media overlays (e.g., an image filter or an image lens) to the interaction client 104 for the augmentation of real-time images received via the camera system 204 or stored images retrieved from memory 502 of a user system 102. These augmentations are selected by the augmentation system 206 and presented to a user of an interaction client 104, based on a number of inputs and data, such as for example:

Geolocation of the user system 102; and

Entity relationship information of the user of the user system 102.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at user system 102 for communication in a message, or applied to video content, such as a video content stream or feed transmitted from an interaction client 104. As such, the image processing system 202 may interact with, and support, the various subsystems of the communication system 208, such as the messaging system 210 and the video communication system 212.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

The augmentation creation system 214 supports augmented reality developer platforms and includes an application for content creators (e.g., artists and developers) to create and publish augmentations (e.g., augmented reality experiences) of the interaction client 104. The augmentation creation system 214 provides a library of built-in features and tools to content creators including, for example custom shaders, tracking technology, and templates.

In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and interaction within the interaction system 100 and includes a messaging system 210, an audio communication system 216, and a video communication system 212. The messaging system 210 is responsible for enforcing the temporary or time-limited access to content by the interaction clients 104. The messaging system 210 incorporates multiple timers (e.g., within an ephemeral timer system) that, based on duration and display parameters associated with a message or collection of messages (e.g., a story), selectively enable access (e.g., for presentation and display) to messages and associated content via the interaction client 104. The audio communication system 216 enables and supports audio communications (e.g., real-time audio chat) between multiple interaction clients 104. Similarly, the video communication system 212 enables and supports video communications (e.g., real-time video chat) between multiple interaction clients 104.

A user management system 218 is operationally responsible for the management of user data and profiles, and maintains entity information (e.g., stored in entity tables 308, entity graphs 310 and profile data 302) regarding users and relationships between users of the interaction system 100.

A collection management system 220 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 220 may also be responsible for publishing an icon that provides notification of a particular collection to the user interface of the interaction client 104. The collection management system 220 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 220 employs machine vision (or image recognition technology) and content rules to curate a content collection automatically. In certain examples, compensation may be paid to a user to include user-generated content into a collection. In such cases, the collection management system 220 operates to automatically make payments to such users to use their content.

In example embodiments, the collection management system 220 is configured to store rules in association with particular types of content collections. As described herein, a rule refers to a list of criteria defining what is allowed for a particular type of content collection. For example, the rules for a particular type of content collection include criteria that specifies if and when particular content collections are available for being added to and/or for being viewed. The collection management system 220 is further configured to determine when the criteria is met for a particular content collection and with respect to a given user, and to prompt the user to contribute and/or view the content collection accordingly.

A map system 222 provides various geographic location (e.g., geolocation) functions and supports the presentation of map-based media content and messages by the interaction client 104. For example, the map system 222 enables the display of user icons or avatars (e.g., stored in profile data 302) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

A game system 224 provides various gaming functions within the context of the interaction client 104. The interaction client 104 provides a game interface providing a list of available games that can be launched by a user within the context of the interaction client 104 and played with other users of the interaction system 100. The interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

An external resource system 226 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes Application Programming Interfaces (APIs) with functions that can be called or invoked by the web-based application. The interaction servers 124 host a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the interaction servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A bridge script running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 124. The interaction servers 124 can add a visual representation (such as a box art or other graphic) of the web-based external resource in the interaction client 104. Once the user selects the visual representation or instructs the interaction client 104 through a GUI of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 228 operationally enables the purchasing of advertisements by third parties for presentation to end-users via the interaction clients 104 and also handles the delivery and presentation of these advertisements.

An artificial intelligence and machine learning system 230 provides a variety of services to different subsystems within the interaction system 100. For example, the artificial intelligence and machine learning system 230 operates with the image processing system 202 and the camera system 204 to analyze images and extract information such as objects, text, or faces. This information can then be used by the image processing system 202 to enhance, filter, or manipulate images. The artificial intelligence and machine learning system 230 may be used by the augmentation system 206 to generate augmented content and augmented reality experiences, such as adding virtual objects or animations to real-world images. The communication system 208 and messaging system 210 may use the artificial intelligence and machine learning system 230 to analyze communication patterns and provide insights into how users interact with each other and provide intelligent message classification and tagging, such as categorizing messages based on sentiment or topic. The artificial intelligence and machine learning system 230 may also provide chatbot functionality to message interactions 120 between user systems 102 and the interaction server system 110. The artificial intelligence and machine learning system 230 may also work with the audio communication system 216 to provide speech recognition and natural language processing capabilities, allowing users to interact with the interaction system 100 using voice commands.

Data Architecture

Figure 3:
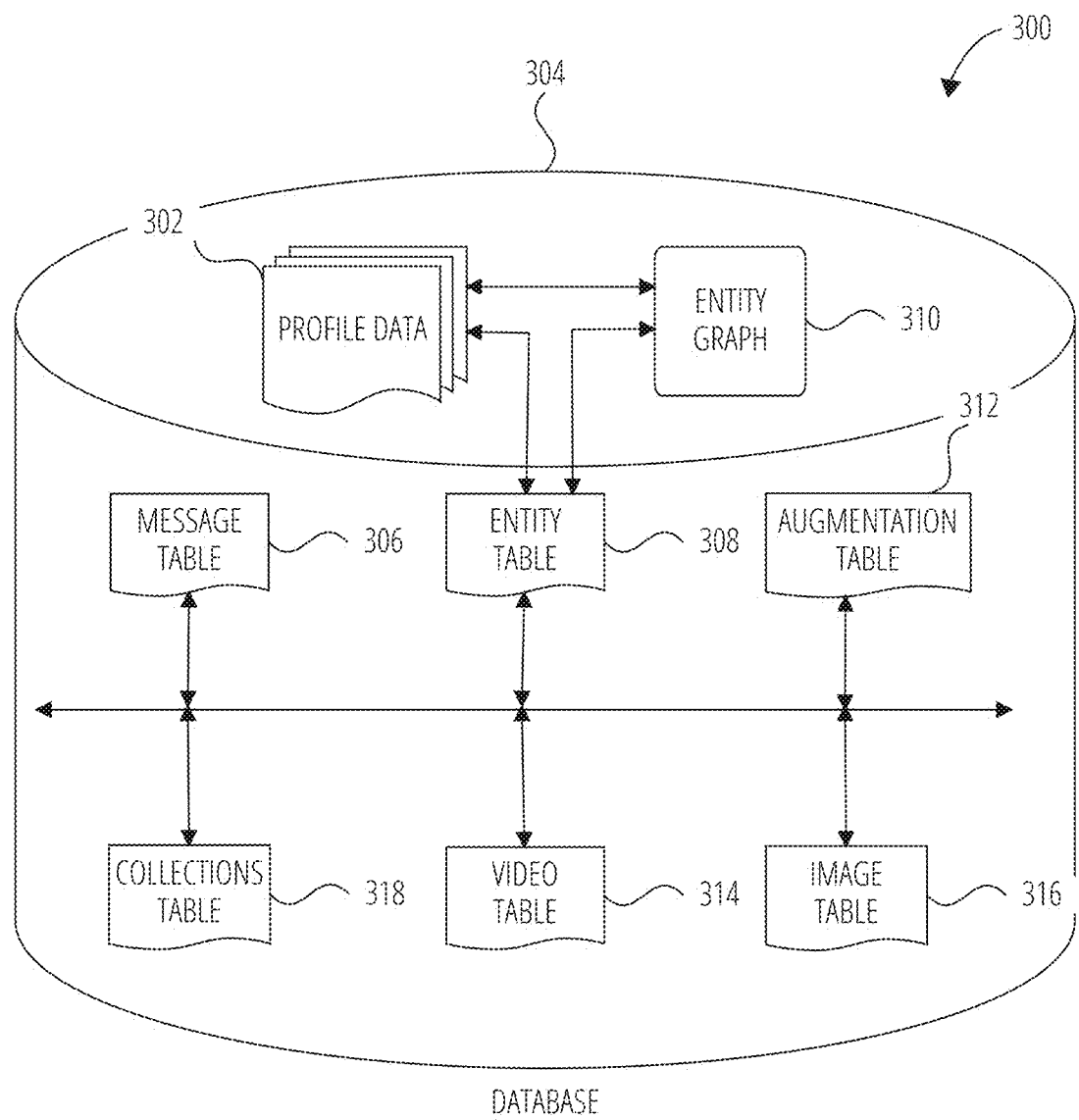
FIG. 3 is a diagrammatic representation of a data structure as maintained in a database, according to some examples.

FIG. 3 is a schematic diagram illustrating data structures 300, which may be stored in the database 304 of the interaction server system 110, according to certain examples. While the content of the database 304 is shown to comprise multiple tables, it will be appreciated that the data could be stored in other types of data structures (e.g., as an object-oriented database).

The database 304 includes message data stored within a message table 306. This message data includes, for any particular message, at least message sender data, message recipient (or receiver) data, and a payload. Further details regarding information that may be included in a message, and included within the message data stored in the message table 306, are described below with reference to FIG. 3.

An entity table 308 stores entity data, and is linked (e.g., referentially) to an entity graph 310 and profile data 302.

Entities for which records are maintained within the entity table 308 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

The entity graph 310 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 100.

Certain permissions and relationships may be attached to each relationship, and also to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 308. Such privacy settings may be applied to all types of relationships within the context of the interaction system 100, or may selectively be applied to certain types of relationships.

The profile data 302 stores multiple types of profile data about a particular entity. The profile data 302 may be selectively used and presented to other users of the interaction system 100 based on privacy settings specified by a particular entity. Where the entity is an individual, the profile data 302 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the interaction system 100, and on map interfaces displayed by interaction clients 104 to other users. The collection of avatar representations may include "status avatars," which present a graphical representation of a status or activity that the user may select to communicate at a particular time.

Where the entity is a group, the profile data 302 for the group may similarly include one or more avatar representations associated with the group, in addition to the group name, members, and various settings (e.g., notifications) for the relevant group.

The database 304 also stores augmentation data, such as overlays or filters, in an augmentation table 312. The augmentation data is associated with and applied to videos (for which data is stored in a video table 314) and images (for which data is stored in an image table 316).

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other augmentation data that may be stored within the image table 316 includes augmented reality content items (e.g., corresponding to applying "lenses" or augmented reality experiences). An augmented reality content item may be a real-time special effect and sound that may be added to an image or a video.

A collections table 318 stores data regarding collections of messages and associated image, video, or audio data, which are compiled into a collection (e.g., a story or a gallery). The creation of a particular collection may be initiated by a particular user (e.g., each user for which a record is maintained in the entity table 308). A user may create a "personal story" in the form of a collection of content that has been created and sent/broadcast by that user. To this end, the user interface of the interaction client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 104, to contribute content to a particular live story. The live story may be identified to the user by the interaction client 104, based on his or her location. The end result is a "live story" told from a community perspective.

A further type of content collection is known as a "location story," which enables a user whose user system 102 is located within a specific geographic location (e.g., on a college or university campus) to contribute to a particular collection. In some examples, a contribution to a location story may employ a second degree of authentication to verify that the end-user belongs to a specific organization or other entity (e.g., is a student on the university campus).

Another type of content collection is known as an "after dark content collection" (or after dark story), which is a collection of content submitted by one or more users during preset evening hours on predefined days of the week. For example, an after dark story is a collection of individual stories submitted by respective users between 8 pm-5 am (e.g., local time for each user) on Thursday, Friday and Saturday of any week. Only those users who contributed to their after dark story is permitted to view the story. The story becomes available for viewing the next morning (e.g., corresponding to the cutoff time for submission) and for a preset duration. For example, the after dark story is accessible for 24 hours starting at 5 am. Each contributing user will have their own associated after dark story, based on an "allowed list" (preselected contacts, all direct contacts, or all direct contacts and their contacts) as specified by that user.

In addition, a further type of content collection is known as a "good morning content collection" (or good morning story), which is a collection of content submitted by one or more users during preset morning hours. For example, a good morning story is a collection of individual stories submitted by respective users between 6 am-12 pm every day of the week. All users are permitted to view the content items submitted by all of their friends (e.g., contacts), regardless of whether or not they contributed to the morning story. Each user is able to view the story the within the same time frame for submitting (e.g., 6 am-12 pm).

Further types of content collections include, but are not limited to: a content collection that requires a particular user attribute (e.g., residing in a particular area, belonging to a particular user group, and the like) in order to contribute to the content collection; and/or a content collection that requires a preset type of content (e.g., use of a particular "lens" or augmented reality content item, image data that is predominantly of a preselected color, and the like) in order to contribute to the content collection.

Moreover, in example embodiments, the collections table 318 stores rules in association with particular types of content collections (e.g., location stories, after dark stories, good morning stories, and the like). By way of non-limiting example, and for each content collection with associated rules, the rules specify one or more criteria such as: a time period, including a start time and a duration, during which user(s) are permitted to contribute (e.g., add content items) to the content collection; a time period, including a start time and a duration, during which user(s) are permitted to view the content collection; preset day(s) of the week that user(s) are permitted to contribute to the content collection; preset day(s) of the week that user(s) are permitted to view the content collection; a required geolocation for contributing to the content collection; a required type of content for contributing to the content collection; required user profile attribute(s) for contributing to the content collection; required user profile attribute(s) for viewing the content collection; and/or which users (e.g., preselected contacts, directs contacts, or contacts of direct contacts) are permitted to view the content collection.

As mentioned above, the video table 314 stores video data that, in some examples, is associated with messages for which records are maintained within the message table 306. Similarly, the image table 316 stores image data associated with messages for which message data is stored in the entity table 308. The entity table 308 may associate various augmentations from the augmentation table 312 with various images and videos stored in the image table 316 and the video table 314.

Data Communications Architecture

Figure 4:
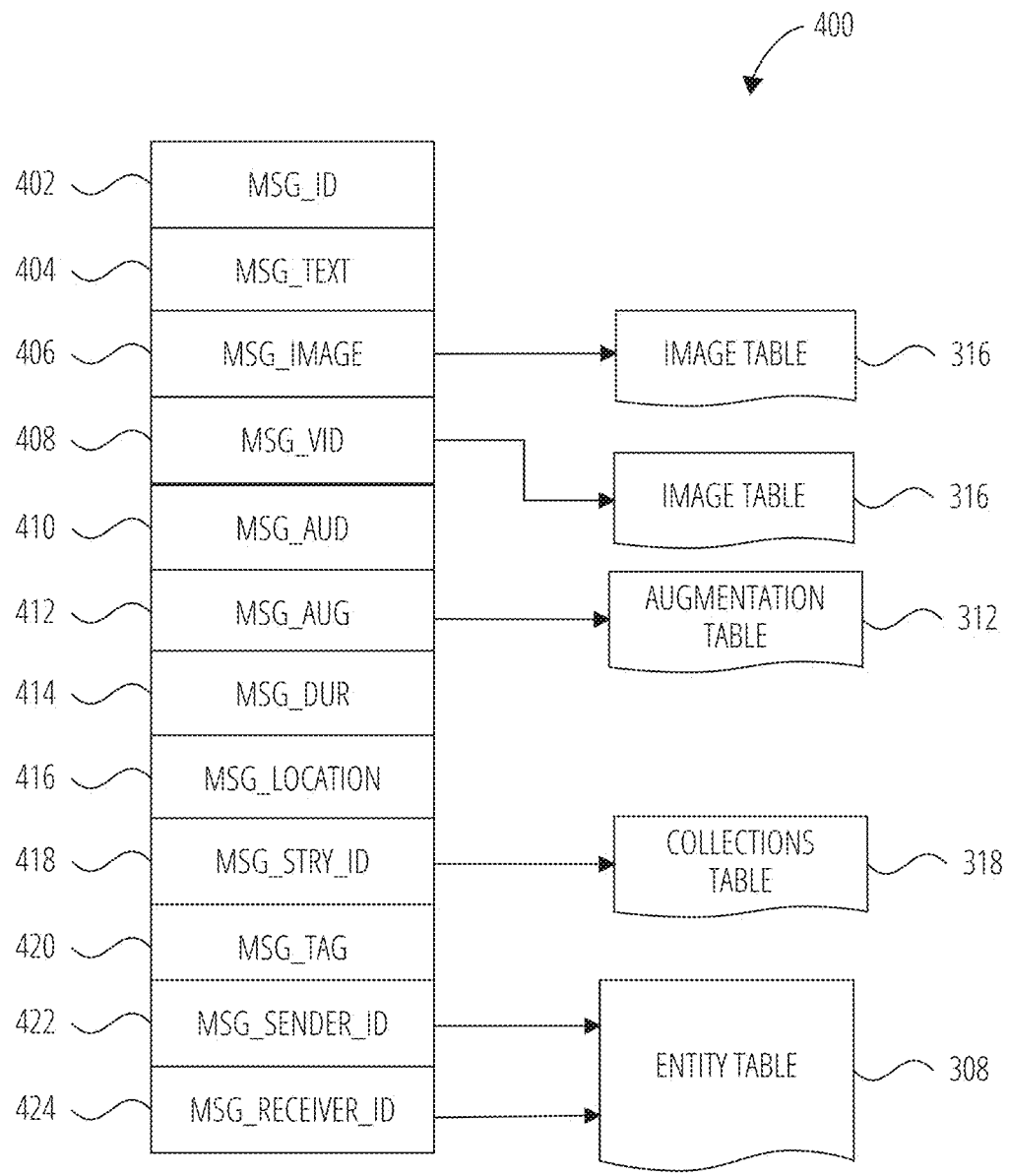
FIG. 4 is a diagrammatic representation of a message, according to some examples.

FIG. 4 is a schematic diagram illustrating a structure of a message 400, according to some examples, generated by an interaction client 104 for communication to a further interaction client 104 via the interaction servers 124. The content of a particular message 400 is used to populate the message table 306 stored within the database 304, accessible by the interaction servers 124. Similarly, the content of a message 400 is stored in memory as "in-transit" or "in-flight" data of the user system 102 or the interaction servers 124. A message 400 is shown to include the following example components:

Message identifier 402: a unique identifier that identifies the message 400.

Message text payload 404: text, to be generated by a user via a user interface of the user system 102, and that is included in the message 400.

Message image payload 406: image data, captured by a camera component of a user system 102 or retrieved from a memory component of a user system 102, and that is included in the message 400. Image data for a sent or received message 400 may be stored in the image table 316.

Message video payload 408: video data, captured by a camera component or retrieved from a memory component of the user system 102, and that is included in the message 400. Video data for a sent or received message 400 may be stored in the image table 316.

Message audio payload 410: audio data, captured by a microphone or retrieved from a memory component of the user system 102, and that is included in the message 400.

Message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 312.

Message duration parameter 414: parameter value indicating, in seconds, the amount of time for which content of the message (e.g., the message image payload 406, message video payload 408, message audio payload 410) is to be presented or made accessible to a user via the interaction client 104.

Message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).

Message story identifier 418: identifier values identifying one or more content collections (e.g., "stories" identified in the collections table 318) with which a particular content item in the message image payload 406 of the message 400 is associated. For example, multiple images within the message image payload 406 may each be associated with multiple content collections using identifier values.

Message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

Message sender identifier 422: an identifier (e.g., a messaging system identifier, email address, or device identifier) indicative of a user of the user system 102 on which the message 400 was generated and from which the message 400 was sent.

Message receiver identifier 424: an identifier (e.g., a messaging system identifier, email address, or device identifier) indicative of a user of the user system 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within an image table 316, values stored within the message augmentation data 412 may point to data stored in an augmentation table 312, values stored within the message story identifier 418 may point to data stored in a collections table 318, and values stored within the message sender identifier 422 and the message receiver identifier 424 may point to user records stored within an entity table 308.

Figure 5:
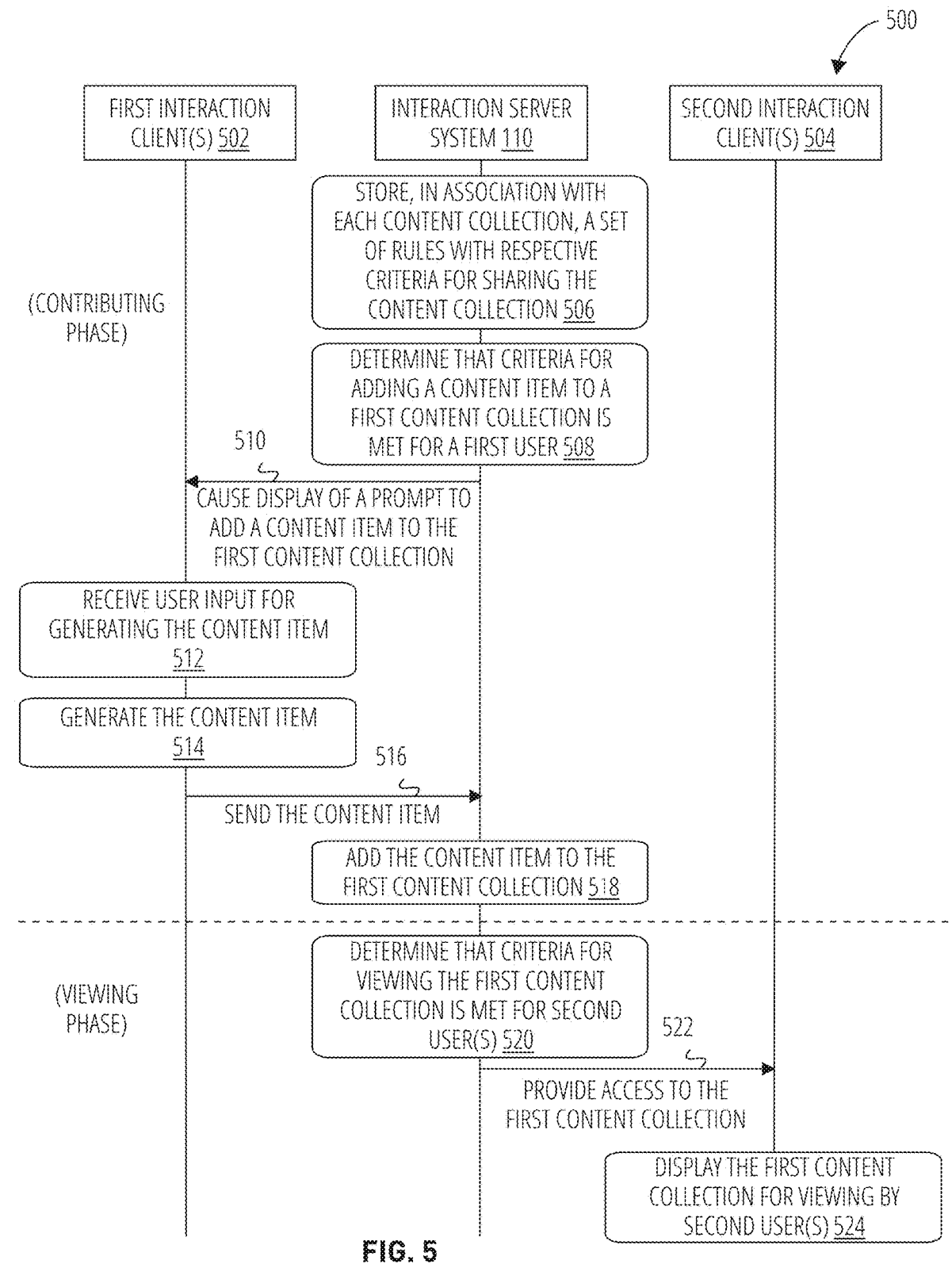
FIG. 5 is an interaction diagram illustrating a process for rule-based sharing of content collections, in accordance with some examples.

FIG. 5 is an interaction diagram illustrating a process 500 for rule-based sharing of content collections, in accordance with some examples. For explanatory purposes, the process 500 is primarily described herein with reference to the interaction client 104 and the interaction server system 110 of FIG. 1. However, one or more blocks (or operations) of the process 500 may be performed by one or more other components, and/or by other suitable devices. Further for explanatory purposes, the blocks (or operations) of the process 500 are described herein as occurring in serial, or linearly. However, multiple blocks (or operations) of the process 500 may occur in parallel or concurrently. In addition, the blocks (or operations) of the process 500 need not be performed in the order shown and/or one or more blocks (or operations) of the process 500 need not be performed and/or can be replaced by other operations. The process 500 may be terminated when its operations are completed. In addition, the process 500 may correspond to a method, a procedure, an algorithm, etc.

In example embodiments, each of the first interaction client(s) 502 and the second interaction client(s) 504 correspond to respective instances of the interaction client 104, with the first interaction client(s) 502 running on a first device (e.g., a first user system 102) and the second interaction client(s) 504 running on second device(s) (e.g., second user systems 102). The first interaction client(s) 502 are associated with respective first user(s), and the second interaction client(s) 504 are associated with respective second user(s) of the interaction system 100. For example, each of the first user(s) is associated with a respective first user account of the interaction server system 110, and each of the second user(s) is associated with a respective second user account of the interaction server system 110. As noted above, the first user(s) and the second user(s) are identified by the interaction server system 110 based on unique identifiers (e.g., a messaging system identifier, email address and/or a device identifier) associated with respective user accounts for the first user(s) and second user(s).

As described herein, the interaction system 100 provides for storing rules in association with sharing particular types of content collections (e.g., stories). For example, for a particular type of content collection, the rules specify one or more of: time periods (e.g., time of day, day(s) of the week) for contributing to and/or viewing the content collection; a required geolocation for contributing to the content collection; a required type of content for contributing to the content collection; required user profile attribute(s) for contributing to and/or viewing the content collection; and/or which users (e.g., preselected contacts, directs contacts, or contacts of direct contacts) are permitted to view the content collection. Based on the stored rules for each type of content collection, the interaction client 104 displays various interface elements to an end user, prompting the user to contribute and/or view the content collection.

In the example of FIG. 5, operations 506-518 correspond to a first phase (e.g., a "contributing phase") and operations 520-524 correspond to a second phase (e.g., a "viewing phase"). During the contributing phase, one or more first user(s) add content item(s) to a first content collection, based on meeting predefined contributing criteria (e.g., time of day, geolocation, user attributes, etc.). During the viewing phase, one or more second user(s) view the first content collection, based on meeting predefined viewing criteria (e.g., time of day, geolocation, etc.). It may be understood that the second phase may occur shortly after the first phase, or after an extended period of time after the first phase. As such, FIG. 5 includes a dashed line separating the first phase and the second phase for illustrative purposes.

At block 506, the interaction server system 110 stores, for each content collection having rules associated therewith, the set of rules and corresponding criteria for sharing that content collection. As noted above, the collection management system 220 is configured to store the rules in the collections table 318 in association with particular types of content collections (e.g., location stories, after dark stories, good morning stories, and the like).

By way of non-limiting example, and for each content collection with associated rules, the rules specify one or more criteria such as: a time period, including a start time and a duration, during which user(s) are permitted to contribute (e.g., add content items) to the content collection; a time period, including a start time and a duration, during which user(s) are permitted to view the content collection; preset day(s) of the week that user(s) are permitted to contribute to the content collection; preset day(s) of the week that user(s) are permitted to view the content collection; a required geolocation for contributing to the content collection; a required type of content for contributing to the content collection; required user profile attribute(s) for contributing to the content collection; required user profile attribute(s) for viewing the content collection; and/or which users (e.g., preselected contacts, directs contacts, or contacts of direct contacts) are permitted to view the content collection.

For each of the content collections having rules associated therewith, the interaction server system 110 is configured to determine whether the respective criteria for that content collection is met with respect to the first user(s). For example, the interaction server system 110 makes such determination while the first user(s) are logged onto the first interaction client(s) 502 (e.g., while the first interaction client(s) 502 is running on the user system 102).

In the example of FIG. 5, the interaction server system 110 determines that the criteria is met for the first user(s) to add a content item to the first content collection (block 508). For example, if the first content collection is an after dark story, the interaction server system 110 determines that the first interaction client(s) 502 is running on the user system 102 during preset evening hours (e.g., 8 pm-5 am local time for the first user) on predefined days of the week (e.g., Thursday, Friday and Saturday). In another example, if the first content collection is a good morning story, the interaction server system 110 determines that the first interaction client(s) 502 is running on the user system 102 during preset morning hours (e.g., 6 am-12 pm local time for the first user) on any day of the week.

At operation 510, the interaction server system 110 causes the first interaction client(s) 502 to display a prompt to contribute (e.g., add a content item) to the first content collection. As discussed below with respect to FIGS. 6A-6B, FIG. 10A, FIGS. 16A-16B and FIG. 20A, the prompt to add a content item may be displayed within a chat interface and/or a personal profile interface of the first interaction client(s) 502.

At block 512, the first interaction client(s) 502 receives user input for generating the content item. For example, the first interaction client(s) 502 initially receives user input selecting the prompt displayed at operation 510. In response, the first interaction client(s) 502 then displays a notification 610 for confirming creation of the media content item (e.g., discussed further below with respect to FIG. 6B and FIG. 16B).

After confirming, the first interaction client(s) 502 displays a camera interface for capturing real-time image data (e.g., discussed below with respect to FIG. 7A and FIG. 17A), followed by a preview interface for previewing, modifying and adding the content item to the first content collection for including in the first content collection (e.g., discussed below with respect to FIG. 7B and FIG. 17B).

After adding the content item to the first content collection, the first interaction client(s) 502 includes user-selectable element(s) for removing/deleting the content item from the first content collection. Moreover, the first interaction client(s) 502 includes user-selectable element(s) for editing the viewers of (e.g., the list of users allowed to view) the content item. In example embodiments, the viewers of the content item default to all direct contacts (e.g., friends) of the user, and the user-selectable element(s) allow the first user(s) to select particular ones of the direct contacts who are permitted to view the content item.

In this manner, the interaction server system 110 provides for each contributing user (e.g., each user who added a content item to an after dark story or to a good morning story) to have a respective content collection for viewing. The members of the content collection correspond to the allowed viewer list (e.g., all contacts or preselected contacts) for that user. Thus, in the example of FIG. 5, the first user(s) provide for sharing the content item to the allowed list of users ("allowed list"), while being permitted to view the content items of other contributing users within his/her allowed list (e.g., subject to the allowed lists of the other contributing users).

At block 514, the first interaction client(s) 502 generates the content item based on the user input. The first interaction client(s) 502 sends the generated content item to the interaction server system 110 (operation 516), and the interaction server system 110 adds the content item to the first content collection (block 518).

In a case where the generated content item is the first content item for adding to the first content collection, the interaction server system 110 is configured to create the first content collection, add the generated content item to the first content collection, and store the first content collection within the collections table 318. Otherwise, the interaction server system 110 is configured to access the first content collection as stored within the collections table 318, and to add the content item to the first content collection.

As noted above, operations 520-524 relate to a viewing phase, during which the second user(s) view the first content collection. In example embodiments, the interaction server system 110 is configured to determine when the second user(s) are logged onto the second interaction client(s) 504 (e.g., when the second interaction client(s) 504 are running on the user system 102).

In the example of FIG. 5, the interaction server system 110 determines that the criteria is met for the second user to view the first content collection (block 520). As noted above, the criteria for viewing a particular content collection may correspond to one or more of time of day during which the content collection is available for viewing, geolocation of the viewing user, identity of the viewing users (e.g., preselected contacts, direct contacts, contacts of direct contacts, and the like), and/or whether the user contributed to the content collection.

For example, if the first content collection is an after dark story, the rules and criteria limit viewers to those who contributed to the first content collection. As noted above, the rules and criteria provide that each user is permitted to view the content items, within the first content collection, of other contributing users within his/her allowed list (e.g., subject to the allowed lists of the other contributing users). Moreover, the criteria provides that viewing of the first content collection is available for viewing starting at a preset time (e.g., 5 am the following morning) for a preset period (e.g., 24 hours).

In another example, if the first content collection is a good morning story, the criteria does not limit viewers to those who contributed to the first content collection. Instead, each user is permitted to view the content items, within the first content collection, submitted by direct contacts (e.g., subject to the allowed lists of the direct contacts). Moreover, the criteria provides that viewing of the first content collection is available for during preset hours (e.g., 6 am to 12 pm every day).

At operation 522, the interaction server system 110 provides the second interaction client(s) 504 (e.g., the allowed list users) with access to the first content collection. In example embodiments, each of the second user(s) is provided with their own version of the first content collection (e.g., based on the above-noted allowed lists of the contributing users). At block 524, the second interaction client(s) 504 displays the first content collection for viewing by the second user(s).

Thus, the interaction system 100 provides for storing rules in association with particular types of content collections (e.g., stories). For each type of content collection, the rules specify one or more of: time periods (e.g., time of day, day(s) of the week) for contributing to and/or viewing the content collection; a required geolocation for contributing to the content collection; a required type of content for contributing to the content collection; required user profile attribute(s) for contributing to and/or viewing the content collection; and/or which users (e.g., preselected contacts, directs contacts, or contacts of direct contacts) are permitted to view the content collection. Based on the stored rules for each type of content collection, the interaction client 104 displays various interface elements to the end user, thereby prompting the end user to contribute and/or view the content collection.

By virtue of the foregoing, the interaction system 100 provides for increased user engagement with respect to contributing to and/or viewing content collections. Moreover, the interaction system 100 facilitates user interaction, for example, by prompting and otherwise notifying users on a particular content collection, based on the rules associated therewith. The interaction system 100 facilitates the creation of content collections for sharing between contacts, thereby saving time for the user, and reducing computational resources/processing power for interaction system 100.

FIGS. 6A-6B illustrate a chat interface 602 prompting a user to add a content item to a content collection with late night content ("an after dark content collection"), in accordance with some examples. In the example of FIG. 6A, the chat interface 602 includes a contacts list 608 and a banner 606 for a particular user (e.g., the first user).

In example embodiments, the profile button 604 is user-selectable to redirect the interaction client 104 to display a personal profile interface, which is discussed further below with respect to FIG. 9. As shown in the example of FIG. 6A, the profile button 604 depicts an avatar of the first user, for example, based on an stored within the profile data 302 in association with the first user.

The contacts list 608 corresponds to a list of the directs contacts (e.g., friends) of the first user. For each listed contact, the contacts list 608 includes a name, icon (e.g., avatar) and status for that friend. For example, the respective statuses may indicate one or more of available messages for viewing, status updates, and the like. Selection of a particular entry within the contacts list 608 provides for displaying the content (e.g., message) or status associated with the corresponding contact.

The banner 606 prompts the first user to add a content item to an after dark content collection. In example embodiments, the banner 606 is only presented during the hours associated with contributing to an after dark content collection (e.g., between 8 pm and 5 am). As shown in the example of FIG. 6A, the local time for the first user is 10:45 pm, which falls within this timeframe. Thus, the interaction server system 110 prompts the first user within the chat interface 602, by displaying the banner 606 (e.g., above the contacts list 608).

In example embodiments, the banner 606 text differs in a case where contacts within the first user's allowed list have already contributed to the after dark content collection. For example, the depicted text to "After Dark-share one highlight of your night with your friends. See their content items tomorrow morning" is replaced by text identifying one or more of the users who already contributed to the content collection. In example aspects, the banner 606 is removable from the chat interface 602 by a predefined gesture (e.g., swipe) from the first user.

In the example of FIG. 6B, the user selects the banner 606. In response to such user selection, the interaction client 104 displays a notification 610 with the user-selectable option for adding a content item to the after dark content collection. The notification 610 includes text indicating that the first user must contribute to the after dark content collection in order to view the after dark content collection, and that the after dark content collection includes the content items contributed by those users within the first user's allowed list. For example, the text within the notification 610 is consistent with the set of rules and corresponding criteria associated with after dark content collections. In example embodiments, the notification 610 only appears the first time after the user selects (e.g., clicks on) the banner 606. Subsequent user selection of the banner 606 causes the interaction client 104 to display a camera interface 702, as discussed below with respect to FIG. 7A.

Figure 7B:
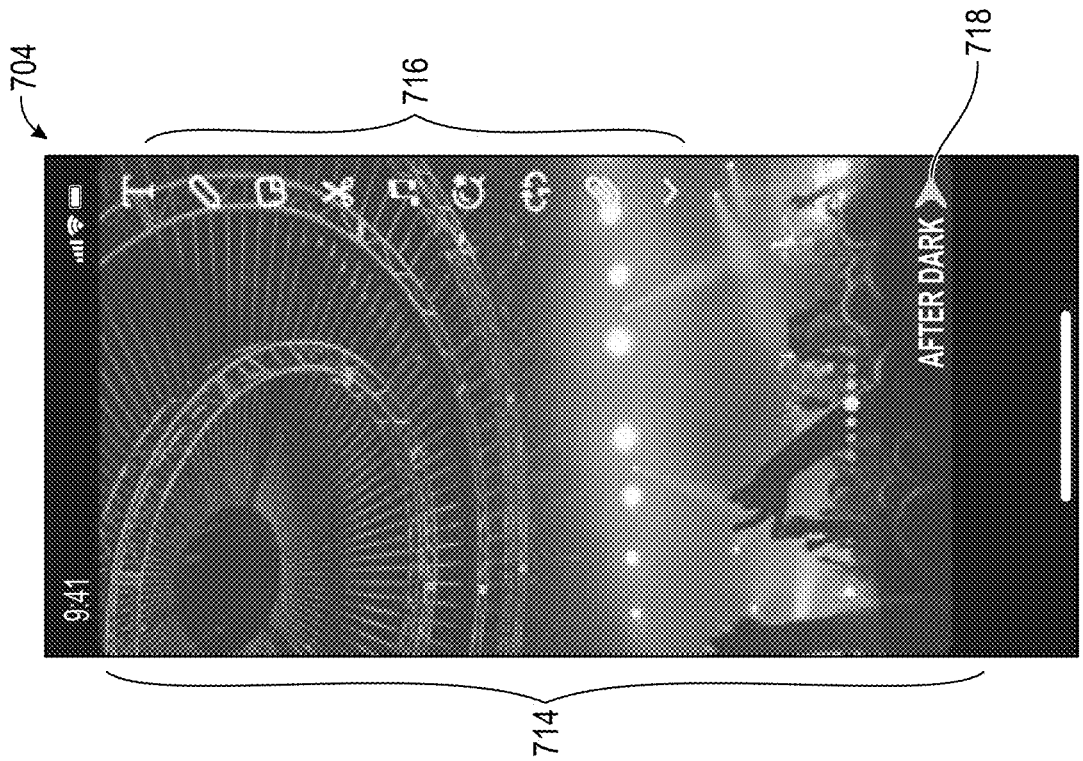
FIGS. 7A-7B illustrate user interfaces for generating a content item for adding to an after dark content collection, in accordance with some examples.
Figure 7A:
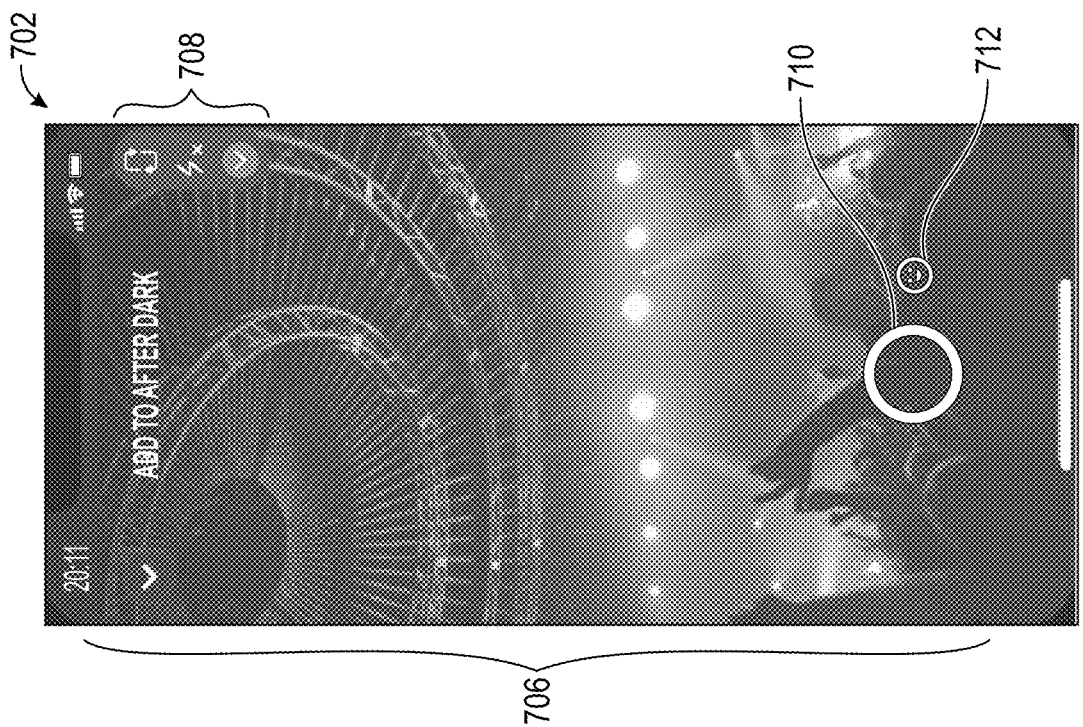

FIGS. 7A-7B illustrate user interfaces (e.g., a camera interface 702 and a preview interface 704) for generating a content item for adding to an after dark content collection, in accordance with some examples. The example of FIG. 7A corresponds to a camera interface 702 which includes image data 706, camera tools 708, a shutter button 710 and a carousel interface launch button 712. The interaction client 104 captures (e.g., via a front-facing camera or a rear-facing camera) image data 706, and the 706 is displayed within the camera interface 702 in real-time.

In example embodiments, the carousel interface launch button 712 is user-selectable to surface a carousel interface (not shown) for augmented reality content. The carousel interface allows first the user to cycle through and/or select different augmented reality content items, represented by respective icons, to apply with respect to the image data 706. Each augmented reality content item provides for adding a real-time special effect and/or sound to the image data 706.

In example embodiments, the shutter button 710 is user-selectable to take a picture (e.g., in response to a press/tap gesture) or to record a video (e.g., in response to a press-and-hold gesture) of the image data 706 captured by the camera. In a case where augmented reality content is selected (e.g., via the carousel interface), such augmented reality content is included with respect to the captured picture or video.

In example embodiments, the camera tools 708 include a flip camera button for switching between front and rear facing cameras, and a flash button for activating a flash of the camera. The camera tools 708 further include an additional tools button for accessing additional modes/features.

The example of FIG. 7B corresponds to a preview interface 704 configured to preview the content item corresponding to the image data 706 captured via the camera interface 702. In one or more embodiments, the preview interface 704 includes editing tools 716, for modifying/annotating (e.g., drawing on, adding text to, adding stickers to, cropping, and the like) the content item. The preview 714 corresponds to a preview of the content item before it is added to the after dark content collection. The send button 718 is a user-selectable button for adding the content item (e.g., with user-selected augmented reality content and/or with user edits via the editing tools 716) to the after dark content collection. In example embodiments, the preview interface 704 only includes the send button 718 with respect to sending, thereby limiting sending to the after dark content collection (e.g., and not providing interface elements for sending to friends, posting to a different content collection, and the like).

FIG. 8 illustrates a chat interface 802 confirming the addition of a content item to an after dark content collection, in accordance with some examples. As shown in the example of FIG. 8, the chat interface 802 includes a profile button 804, a banner 806 and contacts list 808.

Similar to FIG. 6A, the profile button 804 is user-selectable to redirect the interaction client 104 to display a personal profile interface (e.g., as discussed further below with respect to FIG. 9). However, instead of depicting an avatar of the first user (e.g., as in FIG. 6A), the profile button 804 depicts a thumbnail image of the content item generated with respect to FIGS. 7A-7B. For example, the thumbnail image is selected by the interaction server system 110 as a single frame within the video corresponding to the content item. As noted above, the contacts list 808 corresponds to a list of the directs contacts (e.g., friends) of the first user.

In example embodiments, the banner 806 indicates that the first user has already added a content item to the after dark content collection. The banner 806 further indicates that the after dark content collection will be available (e.g., with respect to viewing content items provided by contributing users within the allowed list) in the morning. In example aspects, the banner 806 is user-selectable to preview the content item added by the first user, which is discussed further below with respect to FIG. 11.

FIG. 9 illustrates a personal profile interface 902 confirming the addition of a content item to an after dark content collection, in accordance with some examples. As noted above, the personal profile interface 902 is accessible via user selection of a profile button (e.g., profile button 804 of FIG. 8). The personal profile interface 902 presents information about the first user, such as user name, contact information and/or friends (e.g., contacts) of the first user. Moreover, the personal profile interface 902 includes user-selectable options for updating account settings corresponding to the personal profile, such as personal avatar(s).

The personal profile interface 902 further includes an interface element 904 with user-selectable options to view or preview a content item added to the after dark content collection. For example, the interface element 904 appears as a separate entry within a list of content collections (e.g., appearing under a "My Stories" header) available to the first user.

In example embodiments, the interface element 904 includes a thumbnail image of the content item generated with respect to FIGS. 7A-7B. The thumbnail image is depicted with a badge, such as a moon icon to indicate that the content collection is an after dark content collection. The interface element 904 includes text indicating when the content item was added to the after dark content collection, and when the content item becomes available for viewing by others.

Figure 10A:
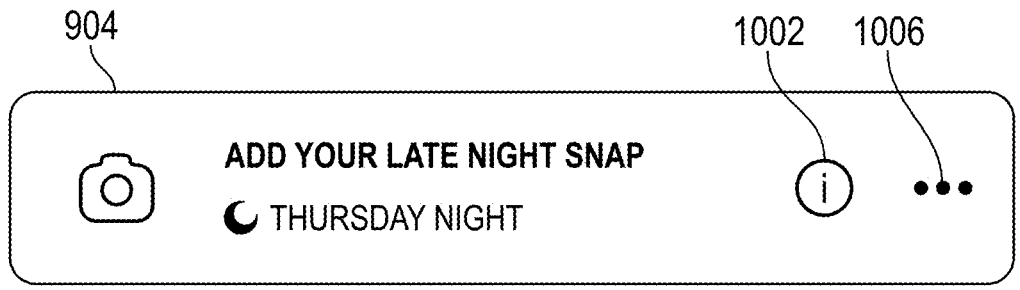
FIGS. 10A-10C illustrate variations of the interface element, which appears within the personal profile interface to indicate an after dark content collection, in accordance with some examples.
Figure 10B:
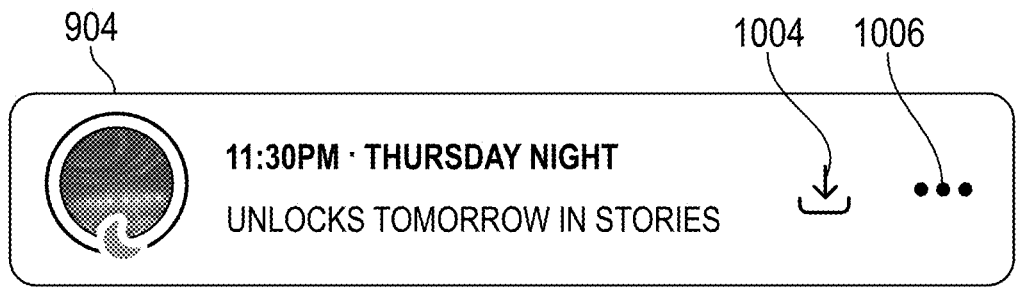
Figure 10C:

FIGS. 10A-10C illustrate variations of the interface element 904, which appears within the personal profile interface 902 to indicate an after dark content collection, in accordance with some examples. FIG. 10A illustrates an example scenario in which the first user has not yet added a content item to the after dark content collection. As shown in the example of FIG. 10A, the interface element 904 includes text prompting the user to contribute a content item (e.g., "add your late night snap"), and text indicating the day of the week associated with the after dark content collection (e.g., "Thursday night"). In another example (not shown), the interface element 904 includes text identifying other users (e.g., contacts) who have already contributed to the after dark content collection. In addition, the interface element 904 includes an info button 1002 which is user-selectable to provide information (e.g., similar to the notification 610 in FIG. 6B) for adding a content item to the after dark content collection. Moreover, the ellipsis 1006 is user-selectable for managing an added content item, as discussed further below with respect to FIG. 12. User selection of another part of the interface element 904 provides for previewing the content item.

FIG. 10B illustrates an example scenario in which the first user has added a content item to the after dark content collection. As shown in the example of FIG. 10B, the interface element 904 includes text indicating the day of the week and time the content item was added (e.g., "11:30 PM"), and text indicating when the after dark content collection become available for viewing (e.g., "Unlocks tomorrow in Stories"). In addition, the interface element 904 includes a save button 1004 which is user-selectable for saving the content item locally or in association with the first user (e.g., "memories"), and the ellipsis 1006. User selection of another part of the interface element 904 provides for previewing the content item.

FIG. 10C illustrates an example scenario in which the first user has added a content item to the after dark content collection. As shown in the example of FIG. 10B, the interface element 904 includes text indicating the day of the week and time the content item was added (e.g., "11:30 PM"), and symbols and/or text indicating a number of views and a number of content items within the after dark content collection. In addition, the interface element 904 includes the save button 1004 and the ellipsis 1006. User selection of another part of the interface element 904 provides for previewing the content item, as discussed below with respect to FIG. 11.

Figures 11, 12:
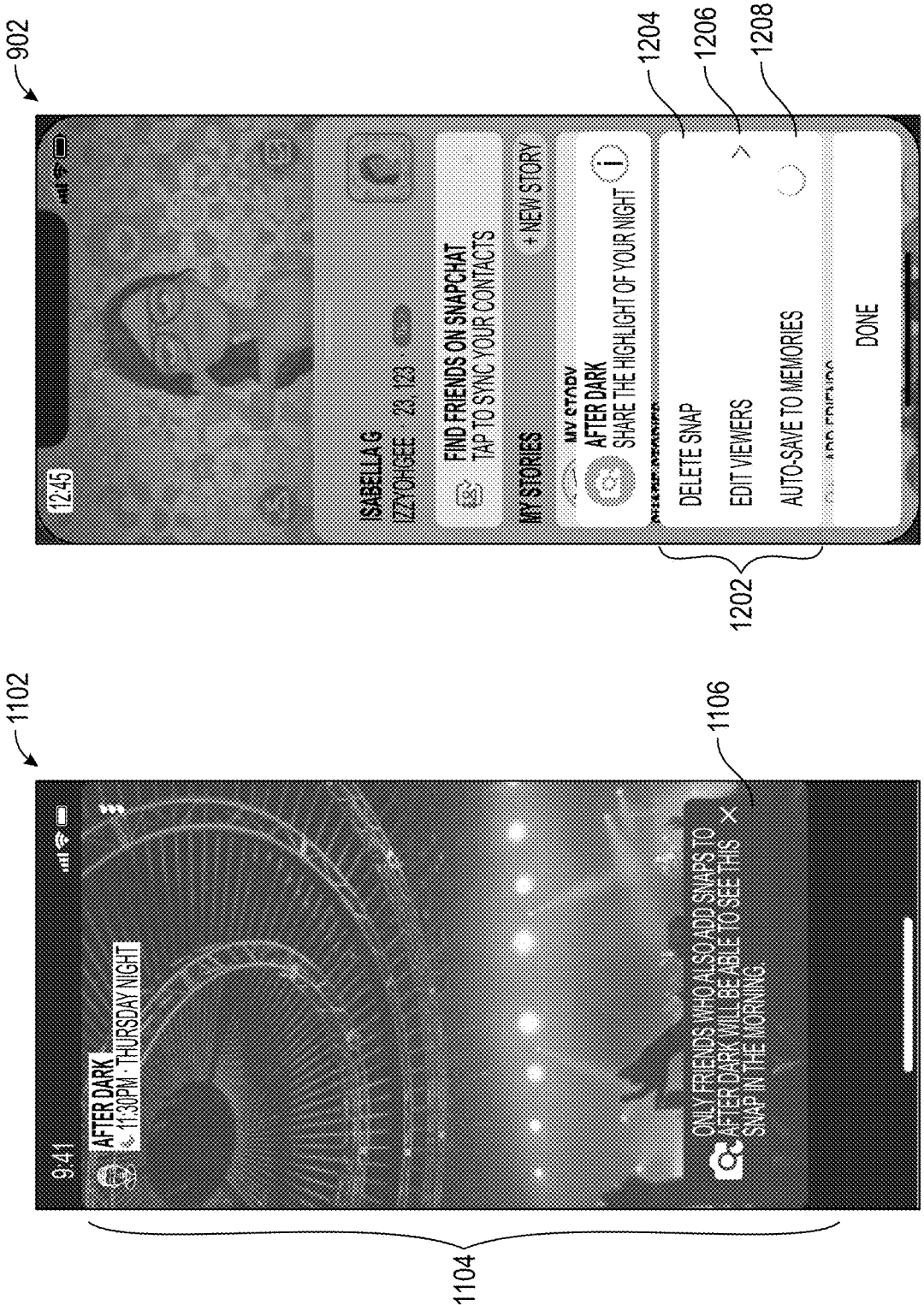
FIG. 11 illustrates a preview interface for previewing an added content item before its after dark content collection becomes available, in accordance with some examples.
FIG. 12 illustrates a menu interface for managing an added content item associated with an after dark content collection, in accordance with some examples.

FIG. 11 illustrates a preview interface 1102 for previewing an added content item before its after dark content collection becomes available, in accordance with some examples. As noted above, the first user is permitted to preview their added content item before its corresponding after dark content collection becomes available. In the example of FIG. 11, the preview interface 1102 displays the content item 1104. The preview interface 1102 further includes a hint 1106 indicating when the after dark content collection will be viewable by others (e.g., users within the allowed list who contributed to the after dark content collection).

FIG. 12 illustrates a menu interface 1202 for managing an added content item associated with an after dark content collection, in accordance with some examples. In example embodiments, the interaction client 104 displays the menu interface 1202 as an overlay on the personal profile interface 902 in response to user selection of the ellipsis 1006 discussed above with respect to FIGS. 10A-10B.

As shown in the example of FIG. 12, the menu interface 1202 includes a button 1204 for deleting the content item from the after dark content collection, presuming that the first user had added a content item. In a case where the first user had not added a content item for the after dark content collection, the button 1204 may instead provide for adding a content item.

In a case where the first user selects the button 1204, the interaction client 104 displays a notification (not shown) indicating that the first user will not be able to view the after dark content collection. In example embodiments, the interaction client 104 further notifies the first user that they are not permitted to contribute another content item for the after dark content collection with respect to that evening.

The menu interface 1202 further includes a button 1206 for editing the viewers (e.g., the allowed list of contacts) associated with the first user's respective version of the after dark content collection. Moreover, the menu interface 1202 includes a toggle 1208 for automatically saving the content item for the first user (e.g., to a personal or "memories" album).

FIG. 13 illustrates a chat interface 1302 indicating that an after dark content collection is available for viewing, in accordance with some examples. In the example of FIG. 13, the chat interface 1302 includes a contacts list 1306 and a banner 1304 for the first user.

In example embodiments, the banner 606 indicates that the after dark content collection for the first user is available for viewing. For example, the banner 606 is displayed within the chat interface 1302 starting at 5 am for a 24-hour timer period. The banner 606 is user-selectable to view the after dark content collection, as discussed further below with respect to FIGS. 15A-15C. The banner 606 is removable from the chat interface 602 by a predefined gesture (e.g., swipe) from the first user. In example embodiments, the avatar displayed within the banner 1304 corresponds to an avatar of one of the users who contributed to the after dark content collection, the user being randomly selected (e.g., by the interaction client 104 and/or the interaction server system 110).

Similar to the contacts list 608 of FIG. 6A, the contacts list 1306 of FIG. 13 includes a list of the directs contacts (e.g., friends) of the first user. While not shown, the chat interface 1302 further includes a profile button (e.g., similar to the profile button 604 in FIG. 6A) for displaying a personal profile interface.

FIG. 14 illustrates a content feeds interface 1402 indicating that an after dark content collection is available for viewing, in accordance with some examples. In the example of FIG. 14, the content feeds interface 1402 includes a contacts content feed 1404, a subscription content feed 1406 and a suggested content feed 1408.

The contacts content feed 1404 includes available content collections corresponding to contacts (e.g., friends) of the first user. Each content collection is represented by a respective icon (e.g., thumbnail) which is user-selectable to view the respective content collection. As shown in the example of FIG. 14, the contacts content feed 1404 includes an icon 1410 for viewing the after dark content collection. The icon 1410 includes a badge (e.g., a moon icon) to indicate that the content collection corresponds to an after dark content collection.

In example embodiments, the subscription content feed 1406 includes user-selectable content submitted by entities (e.g., influencers, companies, and the like) to which the first user subscribes with respect to the interaction system 100. Moreover, the suggested content feed 1408 includes user-selectable content otherwise suggested to the user (e.g., as determined by the interaction system 100).

FIGS. 15A-15C illustrates a playback interface 1502 for viewing an after dark content collection, in accordance with some examples. The playback interface 1502 is configured to automatically iterate through the content items that were contributed (e.g., by the users in the first user's allowed list) to the after dark content collection. Thus, FIG. 15A displays a first content item contributed by a first user within the allowed list, FIG. 15B displays a second content item contributed by a second user within the allowed list and FIG. 15C displays a third content item contributed by a third user within the allowed list.

The interaction client 104 is configured to display each content item in a predefined order (e.g., chronological order in which content items were added to the after dark content collection). A content item corresponding to a video is displayed for the length of the video, and a content item corresponding to an image is displayed for a preset duration (e.g., 3 seconds). The interaction client 104 is configured to skip forward and backward between content items within the after dark content collection in response to respective user input (e.g., tap or swipe gestures).

For each content item within the after dark content collection, the playback interface 1502 includes content item context 1504, a content item 1506, and a reply interface 1508. The content item context 1504 provides contextual information indicating the creator of the content item and the time the content item was created. The content item 1506 corresponds to the captured image data with any modifications (e.g., augmented reality content).

In addition, the playback interface 1502 includes a reply interface 1508 with elements for replying to the user who created that content item. For example, the reply interface 1508 includes an input box configured to receive text input for including in a reply message and a capture button for capturing an image/video to include in the reply message.

Figures 16A, 16B:
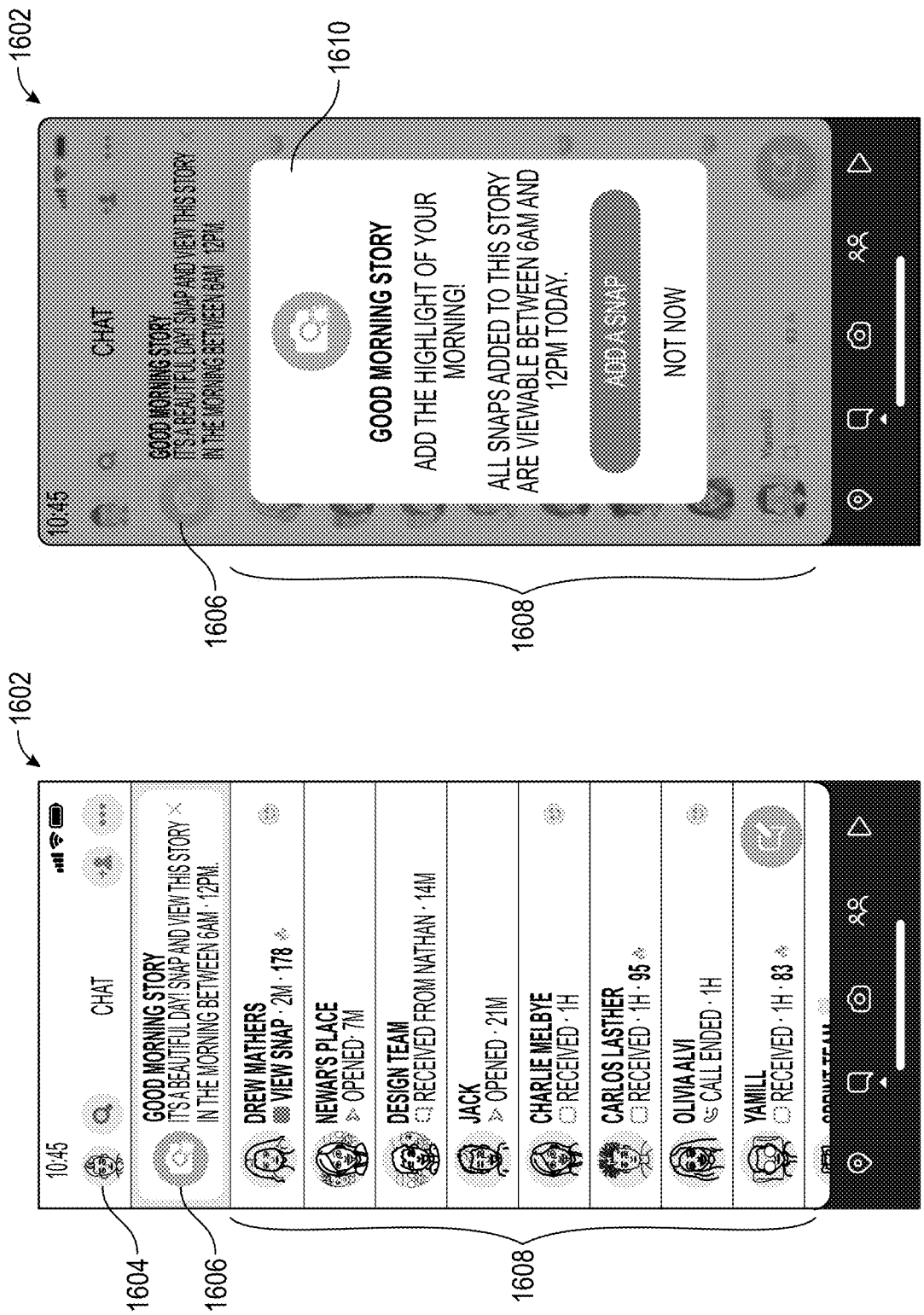
FIGS. 16A-16B illustrate a chat interface prompting a user to add a content item to a content collection with morning content ("a good morning content collection"), in accordance with some examples.

FIGS. 16A-16B illustrate a chat interface prompting a user to add a content item to a content collection with morning content ("a good morning content collection"), in accordance with some examples. In the example of FIG. 16A, the chat interface 1602 includes a contacts list 1608 and a banner 1606 for a particular user (e.g., the first user).

In example embodiments, the profile button 1604 is user-selectable to redirect the interaction client 104 to display a personal profile interface, which is discussed further below with respect to FIG. 19. As shown in the example of FIG. 16A, the profile button 1604 depicts an avatar of the first user, for example, based on an stored within the profile data 302 in association with the first user.

The contacts list 1608 corresponds to a list of the directs contacts (e.g., friends) of the first user. For each listed contact, the contacts list 1608 includes a name, icon (e.g., avatar) and status for that friend. For example, the respective statuses may indicate one or more of available messages for viewing, status updates, and the like. Selection of a particular entry within the contacts list 1608 provides for displaying the content (e.g., message) or status associated with the corresponding contact.

In example embodiments, the banner 1606 prompts the first user to add a content item to a good morning content collection. In example embodiments, the banner 1606 is only presented during the hours associated with contributing to good morning content collection (e.g., between 6 6 am and 12 pm). As shown in the example of FIG. 16A, the local time for the first user is 10:45 am, which falls within this timeframe. Thus, interaction server system 110 prompts the first user within the chat interface 1602, by displaying the banner 1606 (e.g., above the contacts list 1608). In example aspects, the banner 606 is removable from the chat interface 602 by a predefined gesture (e.g., swipe) from the first user.

In example embodiments, the banner 1606 text differs in a case where contacts within the first user's allowed list have already contributed to the good morning content collection. For example, the depicted "Good Morning Story" and accompanying text is replaced with text identifying one or more of the users who already contributed to the content collection. In such a case, the banner 1606 further includes a button (e.g., camera button) which is user-selectable for the user to add a content item to the good morning content collection (e.g., per FIG. 16B). Selection within the banner 1606 other than the camera button provides for playback of the good morning content collection (e.g., similar to FIGS. 15A-15C).

In the example of FIG. 16B, the user selects the banner 1606 (in a case where no other users have contributed), or the user selects the camera button appearing within the banner 1606 (in a case where at least one other user contributed). In response to such user selection, the interaction client 104 displays a notification 1610 with a user-selectable option for adding a content item to the good morning content collection or for cancelling. The notification 1610 includes text indicating that all content items added to the good morning content collection are viewable during the predefined hours (e.g., 6 am to 12 pm) for contributing a content item. For example, the text within the notification 1610 is consistent with the set of rules and corresponding criteria associated with good morning content collections.

Figures 17A, 17B:
FIGS. 17A-17B illustrate user interfaces for generating a content item for adding to a good morning content collection, in accordance with some examples.

FIGS. 17A-17B illustrate user interfaces (e.g., a camera interface 1702 and a preview interface 1704) for generating a content item for adding to a good morning content collection, in accordance with some examples. The example of FIG. 17A corresponds to a camera interface 1702 which includes image data 1706, camera tools 1708, a shutter button 1710 and a carousel interface launch button 1712. The interaction client 104 captures (e.g., via a front-facing camera or a rear-facing camera) image data 1706, and the image data 1706 is displayed within the camera interface 1702 in real-time.

In example embodiments, the carousel interface launch button 1712 is user-selectable to surface a carousel interface (not shown) for augmented reality content. The carousel interface allows first the user to cycle through and/or select different augmented reality content items, represented by respective icons, to apply with respect to the image data 1706. Each augmented reality content item provides for adding a real-time special effect and/or sound to the image data 706.

In example embodiments, the shutter button 1710 is user-selectable to take a picture (e.g., in response to a press/tap gesture) or to record a video (e.g., in response to a press-and-hold gesture) of the image data 1706 captured by the camera. In a case where augmented reality content is selected (e.g., via the carousel interface), such augmented reality content is included with respect to the captured picture or video.

In example embodiments, the camera tools 1708 include a flip camera button for switching between front and rear facing cameras, and a flash button for activating a flash of the camera. The camera tools 1708 further include an additional tools button for accessing additional modes/features.

The example of FIG. 17B corresponds to a preview interface 704 configured to preview the content item corresponding to the image data 1706 captured via the camera interface 1702. In one or more embodiments, the preview interface 1704 includes editing tools 1716, for modifying/annotating (e.g., drawing on, adding text to, adding stickers to, cropping, and the like) the content item. The preview 1714 corresponds to a preview of the content item before it is added to the good morning content collection. The send button 1718 is a user-selectable button for adding the content item (e.g., with user-selected augmented reality content and/or with user edits via the editing tools 1716) to the good morning content collection.

Figure 18:
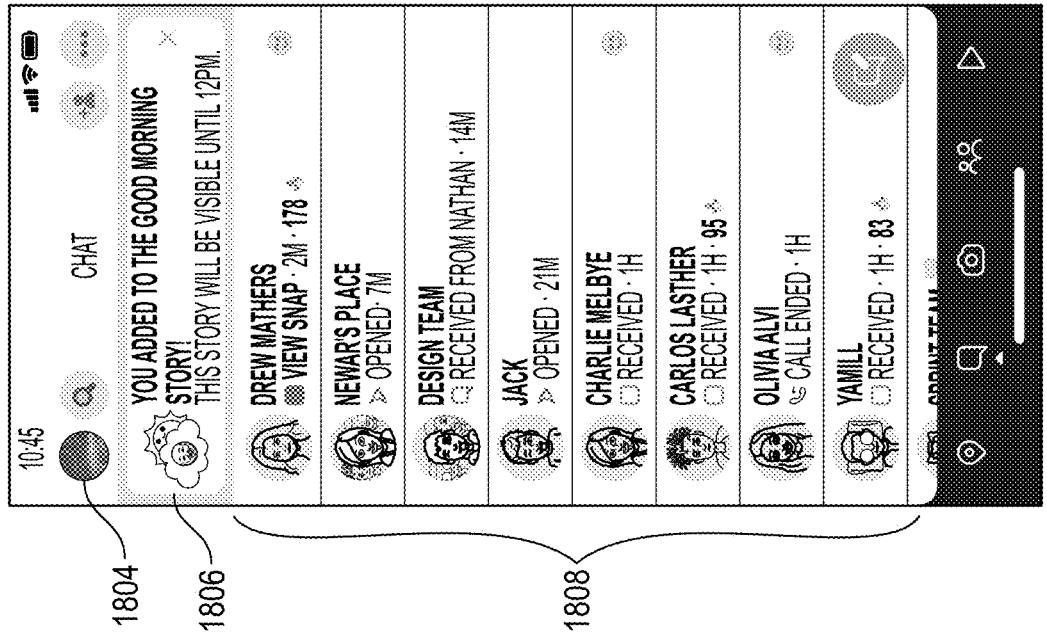
FIG. 18 illustrates a chat interface confirming the addition of a content item to a good morning content collection, in accordance with some examples.

FIG. 18 illustrates a chat interface 1802 confirming the addition of a content item to a good morning content collection, in accordance with some examples. As shown in the example of FIG. 18, the chat interface 1802 includes a profile button 1804, a banner 1806 and contacts list 1808.

Similar to FIG. 16A, the profile button 1804 is user-selectable to redirect the interaction client 104 to display a personal profile interface (e.g., as discussed further below with respect to FIG. 19). However, instead of depicting an avatar of the first user (e.g., as in FIG. 16A), the profile button 1804 depicts a thumbnail image of the content item generated with respect to FIGS. 17A-17B. For example, the thumbnail image is selected by the interaction server system 110 as a single frame within the video corresponding to the content item. As noted above, the contacts list 1608 corresponds to a list of the directs contacts (e.g., friends) of the first user.

In example embodiments, the banner 1806 indicates that the first user has already added a content item to the good morning content collection. The banner 1806 further indicates that the good morning content collection is available for viewing (e.g., with respect to viewing content items provided by contributing users within the allowed list) for a preset time period (e.g., 6 am to 12 pm). In example aspects, the banner 1806 is user-selectable to view the good morning content collection, as discussed further below with respect to FIG. 11.

Figure 19:
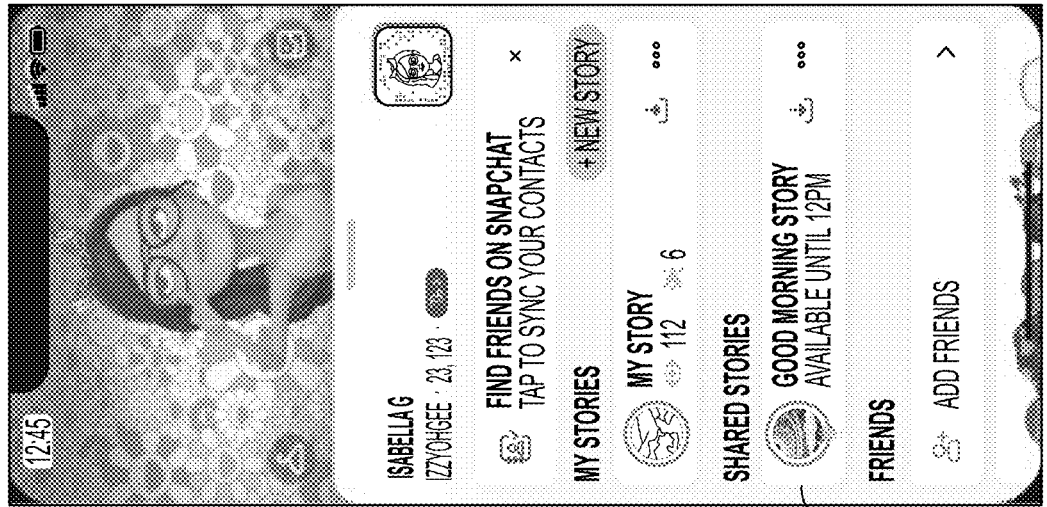
FIG. 19 illustrates a personal profile interface confirming the addition of a content item to a good morning content collection, in accordance with some examples.

FIG. 19 illustrates a personal profile interface 1902 confirming the addition of a content item to a good morning content collection, in accordance with some examples. As noted above, the personal profile interface 902 is accessible via user selection of a profile button (e.g., profile button 804 of FIG. 8). The personal profile interface 1902 presents information about the first user, such as user name, contact information and/or friends (e.g., contacts) of the first user. Moreover, the personal profile interface 1902 includes user-selectable options for updating account settings corresponding to the personal profile, such as personal avatar(s).

The personal profile interface 1902 further includes an interface element 1904 with user-selectable options to view the good morning content collection. For example, the interface element 1904 appears as a separate entry within a list of content collections (e.g., appearing under a "My Stories" header) available to the first user.

In example embodiments, the interface element 904 includes a thumbnail image of the content item generated with respect to FIGS. 17A-17B. The thumbnail image is depicted with a badge, such as a sun icon to indicate that the content collection is a good morning content collection. The interface element 1904 includes text indicating when the content item was added to the good morning content collection, and how long the good morning content collection is available for viewing by the first user those on the allowed list.

Figure 20A:
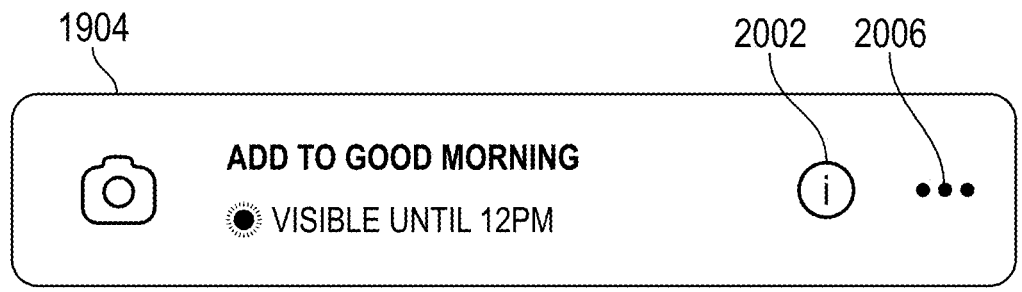
FIGS. 20A-20C illustrate variations of the interface element, which appears within the personal profile interface to indicate a good morning content collection.
Figure 20B:
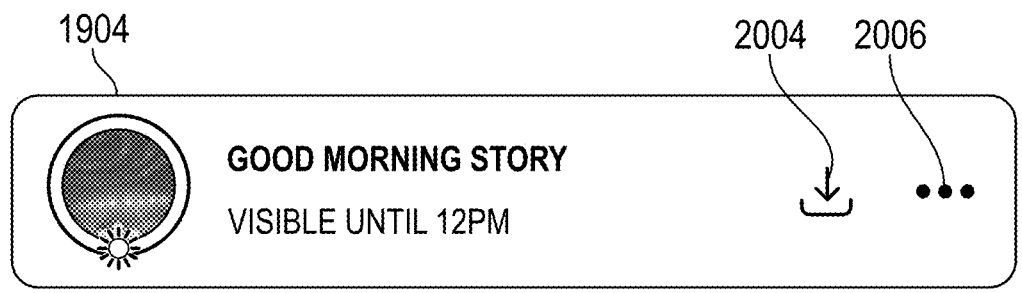
Figure 20C:
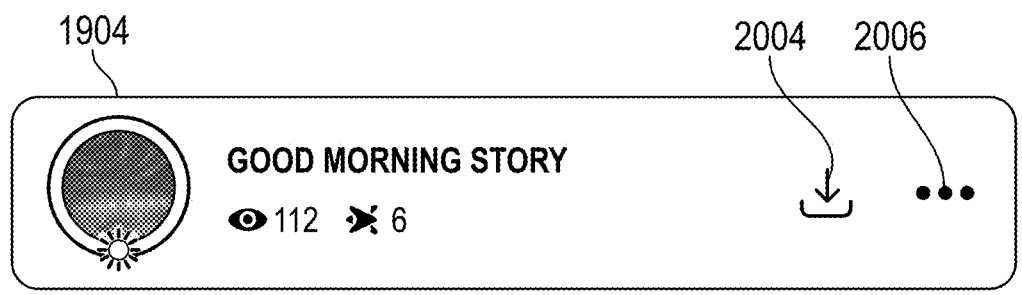

FIGS. 20A-20C illustrate variations of the interface element 1904, which appears within the personal profile interface 1902 to indicate a good morning content collection, in accordance with some examples. FIG. 20A illustrates an example scenario in which the first user has not yet added a content item to the good morning content collection. As shown in the example of FIG. 20A, the interface element 1904 includes text prompting the user to contribute a content item (e.g., "add to good morning"), and text indicating how until what time the good morning content collection is available for viewing. In another example (not shown), the interface element 1904 includes text identifying other users (e.g., contacts) who have already contributed to the good morning content collection. In addition, the interface element 1904 includes an info button 2002 which is user-selectable to provide information (e.g., similar to the notification 1610 in FIG. 16B) for adding a content item to the good morning content collection. Moreover, the ellipsis 2006 is user-selectable for managing an added content item, as discussed further below with respect to FIG. 21. User selection of another part of the interface element 1904 provides for viewing the good morning content collection.

FIG. 20B illustrates an example scenario in which the first user has added a content item to the good morning content collection. As shown in the example of FIG. 20B, the interface element 904 includes text indicating that the good morning content collection is available for viewing until a preset time (e.g., "12 PM"). In addition, the interface element 1904 includes a save button 2004 which is user-selectable for saving the content item (or in the alternative, the good morning content collection) locally or in association with the first user (e.g., "memories"), and the ellipsis 2006. User selection of another part of the interface element 1904 provides for viewing the good morning content collection.

FIG. 20C illustrates an example scenario in which the first user has added a content item to the good morning content collection. As shown in the example of FIG. 20C, the interface element 1904 includes symbols and/or text indicating a number of views and a number of content items within the good morning content collection. In addition, the interface element 1904 includes the save button 2004 and the ellipsis 2006. User selection of another part of the interface element 1904 provides for viewing the good morning content collection, for example, similar to the playback interface 1502 discussed above with respect to FIGS. 15A-15C.

FIG. 21 illustrates a menu interface 2108 for deleting an added content item and updating the users associated with a good morning content collection, in accordance with some examples. In example embodiments, the interaction client 104 displays the menu interface 2108 as an overlay on the personal profile interface 1902 in response to user selection of the ellipsis 2006 discussed above with respect to FIGS. 20A-20B.

As shown in the example of FIG. 21, the menu interface 2108 includes a button 2102 for deleting the content item from the good morning content collection, presuming that the first user had added a content item. In a case where the first user had not added a content item for the good morning content collection, the button 2102 may instead provide for adding a content item.

The menu interface 2108 further includes a button 2104 for editing the viewers (e.g., the allowed list of contacts) associated with the first user's respective version of the good morning content collection. Moreover, the menu interface 2108 includes a button 2106 for automatically saving the content item for the first user (e.g., to a "memories" album).

FIG. 22 illustrates a send to interface 2202 for adding a generated content item to a good morning content collection, in accordance with some examples. The send to interface 2202 includes a search input box 2204, a content collections header 2206 ("stories") and cells 2208-2210.

In example embodiments, the send to interface 2202 is surfaced after the first user generates a content item. For example, the interaction client 104 activates a camera (e.g., a front-facing camera, or a rear-facing camera) of the user system 102 upon startup. The interaction client 104 provides for displaying, within the user interface, the real-time image data captured by the camera, provides for the first user to create the content item (e.g., with augmented reality content, if applicable) using the image data. User selection of the cell 2208 provides for the interaction client 104 to add the content item to the user's personal content collection (e.g., "my story).

User selection of the cell 2210 provides for the interaction client 104 to add the content item to the good morning story content collection for the first user. In example aspects, the cell 2210 only appears within the send to interface 2202 when the timing criteria is met (e.g., 6 am to 12 pm) for good morning content collection.

While not shown in the example of FIG. 22, the send to interface 2202 may include additional cells corresponding to candidate recipients of a content item. For example, candidate recipients (e.g., contacts, friends) are assigned respective cells, each of which are user-selectable to indicate a recipient of a generated content item. The search input box 2204 allows the user to search via a keyboard interface (e.g., not shown) for particular contacts.

Figure 23:
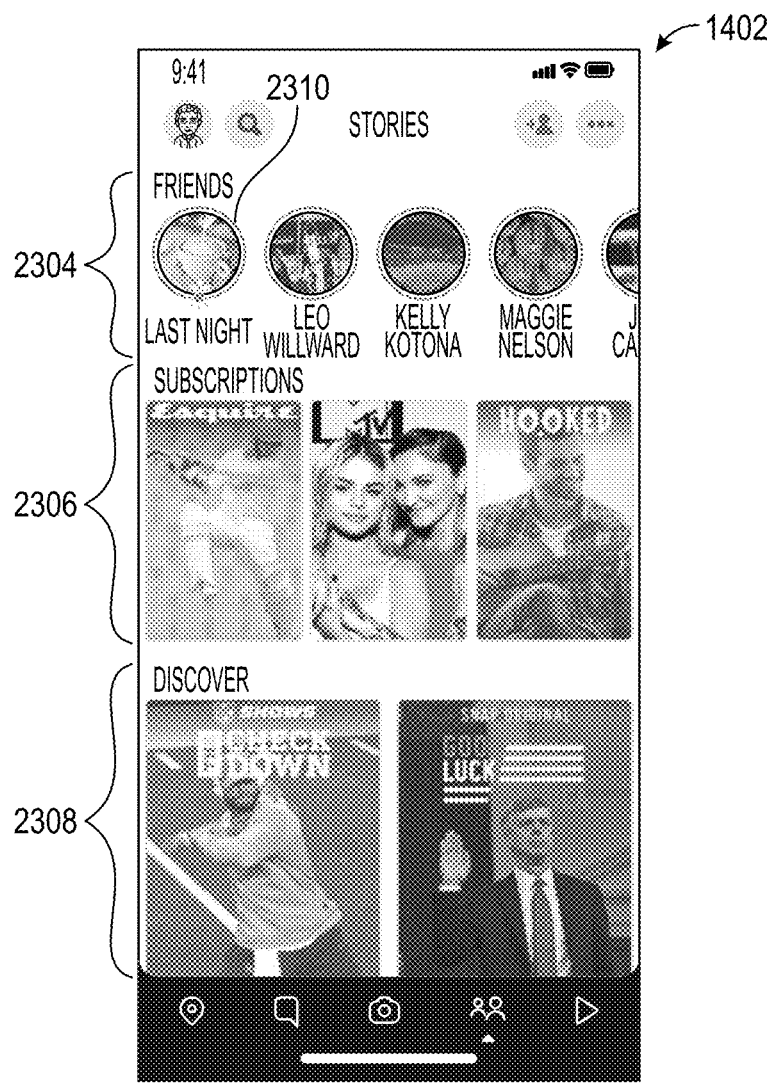
FIG. 23 illustrates a content feeds interface indicating that a good morning content collection is available for viewing, in accordance with some examples.

FIG. 23 illustrates a content feeds interface 2302 indicating that a good morning content collection is available for viewing, in accordance with some examples. In the example of FIG. 23, the content feeds interface 1402 includes a contacts content feed 2304, a subscription content feed 2306 and a suggested content feed 2308.

The contacts content feed 2304 includes available content collections corresponding to contacts (e.g., friends) of the first user. Each content collection is represented by a respective icon (e.g., thumbnail) which is user-selectable to view the respective content collection. As shown in the example of FIG. 23, the contacts content feed 2304 includes a banner 2310 for viewing the good morning content collection. The banner 2310 includes a badge (e.g., a sun icon) to indicate that the content collection corresponds to an good morning content collection.

In example embodiments, the subscription content feed 2306 includes user-selectable content submitted by entities (e.g., influencers, companies, and the like) to which the first user subscribes with respect to the interaction system 100. Moreover, the suggested content feed 1408 includes user-selectable content otherwise suggested to the user (e.g., as determined by the interaction system 100).

Figure 24:
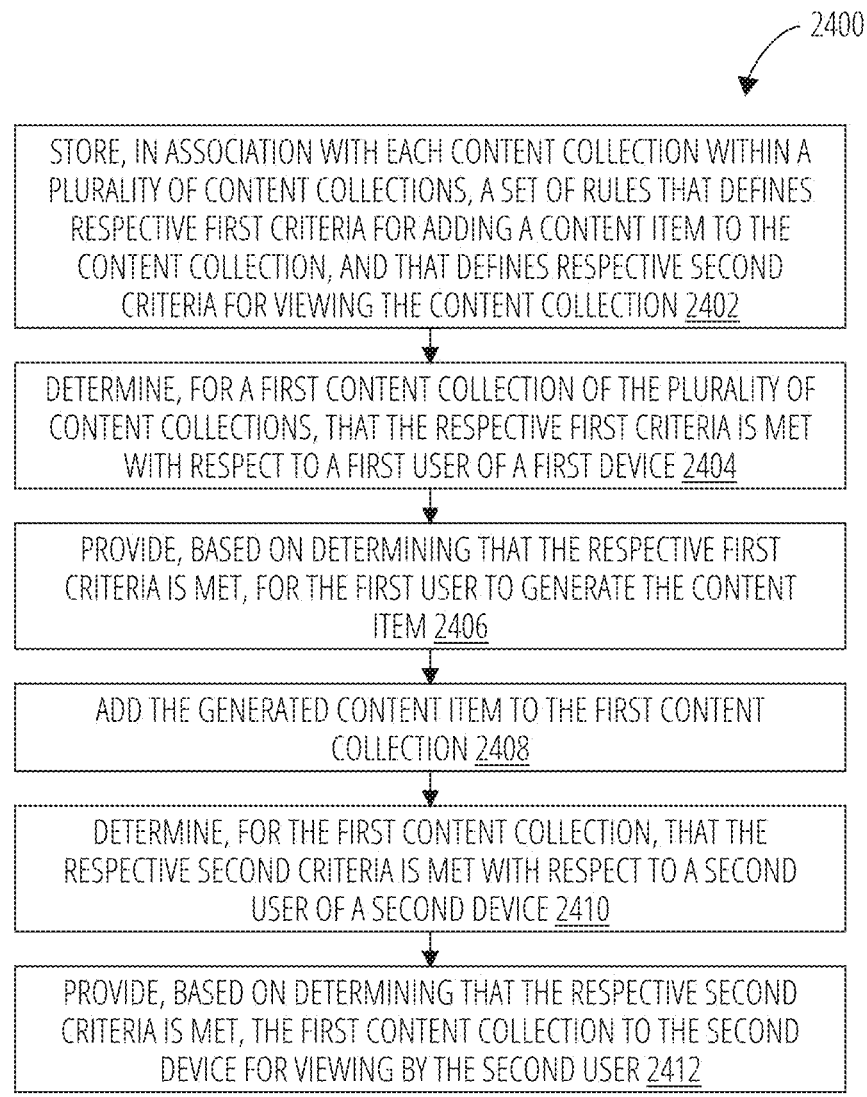
FIG. 24 is a flowchart illustrating a process for rule-based sharing of content collections, in accordance with some examples.

FIG. 24 is a flowchart illustrating a process 2400 for rule-based sharing of content collections, in accordance with some examples. For explanatory purposes, the process 2400 is primarily described herein with reference to the interaction server system 110 of FIG. 1. However, one or more blocks (or operations) of the process 2400 may be performed by one or more other components, and/or by other suitable devices. Further for explanatory purposes, the blocks (or operations) of the process 2400 are described herein as occurring in serial, or linearly. However, multiple blocks (or operations) of the process 2400 may occur in parallel or concurrently. In addition, the blocks (or operations) of the process 2400 need not be performed in the order shown and/or one or more blocks (or operations) of the process 2400 need not be performed and/or can be replaced by other operations. The process 2400 may be terminated when its operations are completed. In addition, the process 2400 may correspond to a method, a procedure, an algorithm, etc.

The interaction server system 110 stores, in association with each content collection within a plurality of content collections, a set of rules that defines respective first criteria for adding a content item to the content collection (block 2402). The set of rules further defines respective second criteria for viewing the content collection. In example embodiments, the respective first criteria specifies a first time period during which the first user is permitted to add the content item to the first content collection.

In a first example, the first time period starts at a preset time of night for a given day (e.g., Thursday through Saturday), and the respective second criteria specifies a second time period during which the second user is permitted to view the first content collection, the second time period starting at a preset time of morning after the given day. Moreover, the respective second criteria limits viewing to users who contributed content to the first content collection.

In a second example, the first time period starts at a preset time of morning for a given day. The respective second criteria limits viewing of the first content collection by the second user to the first time period on the given day.

In example embodiments, the respective first criteria specifies one or more of: a required geolocation of the first device, in order to add the content item to the first content collection; at least one user profile attribute to be met by the first user, in order to add the content item to the first content collection; and/or a required type of content to include in the content item, in order to add the content item to the first content collection.

In example embodiments, the respective second criteria specifies one or more of: a required geolocation of the second device, in order to view the first content collection; and/or which users associated the first user are permitted to view the first content collection. For example, the users associated with the first user who are permitted to view the first content collection correspond one of: preselected users directly connected to the first user; all users directly connected to the first user; or all users directly connected to the first user and their direct contacts.

The interaction server system 110 determines, for a first content collection of the plurality of content collections, that the respective first criteria is met with respect to a first user of a first device (block 2404). The interaction server system 110 provides, based on determining that the respective first criteria is met, for the first user to generate the content item (block 2406). The interaction server system 110 adds the generated content item to the first content collection (block 2408).

The interaction server system 110 determines, for the first content collection, that the respective second criteria is met with respect to a second user of a second device (block 2410). The interaction server system 110 provides, based on determining that the respective second criteria is met, the first content collection to the second device for viewing by the second user (block 2412).

Machine Architecture

Figure 25:
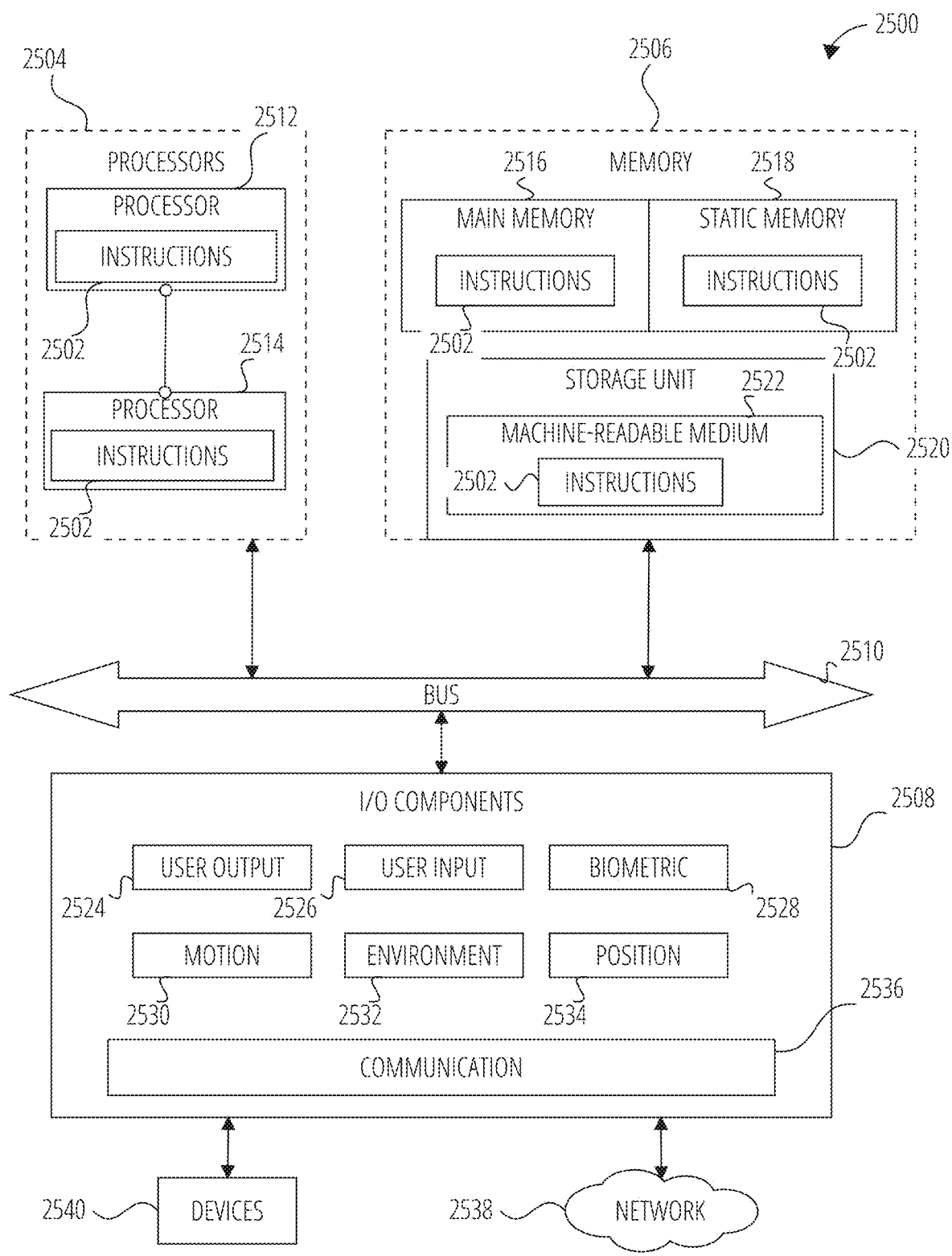
FIG. 25 is a diagrammatic representation of a machine in the form of a computer system within which a set of instructions may be executed to cause the machine to perform any one or more of the methodologies discussed herein, according to some examples.

FIG. 25 is a diagrammatic representation of the machine 2500 within which instructions 2502 (e.g., software, a program, an application, an applet, an app, or other executable code) for causing the machine 2500 to perform any one or more of the methodologies discussed herein may be executed. For example, the instructions 2502 may cause the machine 2500 to execute any one or more of the methods described herein. The instructions 2502 transform the general, non-programmed machine 2500 into a particular machine 2500 programmed to carry out the described and illustrated functions in the manner described. The machine 2500 may operate as a standalone device or may be coupled (e.g., networked) to other machines. In a networked deployment, the machine 2500 may operate in the capacity of a server machine or a client machine in a server-client network environment, or as a peer machine in a peer-to-peer (or distributed) network environment. The machine 2500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 2502, sequentially or otherwise, that specify actions to be taken by the machine 2500. Further, while a single machine 2500 is illustrated, the term "machine" shall also be taken to include a collection of machines that individually or jointly execute the instructions 2502 to perform any one or more of the methodologies discussed herein. The machine 2500, for example, may comprise the user system 102 or any one of multiple server devices forming part of the interaction server system 110. In some examples, the machine 2500 may also comprise both client and server systems, with certain operations of a particular method or algorithm being performed on the server-side and with certain operations of the particular method or algorithm being performed on the client-side.

The machine 2500 may include processors 2504, memory 2506, and input/output I/O components 2508, which may be configured to communicate with each other via a bus 2510. In an example, the processors 2504 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 2512 and a processor 2514 that execute the instructions 2502. The term "processor" is intended to include multi-core processors that may comprise two or more independent processors (sometimes referred to as "cores") that may execute instructions contemporaneously. Although FIG. 25 shows multiple processors 2504, the machine 2500 may include a single processor with a single-core, a single processor with multiple cores (e.g., a multi-core processor), multiple processors with a single core, multiple processors with multiples cores, or any combination thereof.

The memory 2506 includes a main memory 2516, a static memory 2518, and a storage unit 2520, both accessible to the processors 2504 via the bus 2510. The main memory 2506, the static memory 2518, and storage unit 2520 store the instructions 2502 embodying any one or more of the methodologies or functions described herein. The instructions 2502 may also reside, completely or partially, within the main memory 2516, within the static memory 2518, within machine-readable medium 2522 within the storage unit 2520, within at least one of the processors 2504 (e.g., within the processor's cache memory), or any suitable combination thereof, during execution thereof by the machine 2500.

The I/O components 2508 may include a wide variety of components to receive input, provide output, produce output, transmit information, exchange information, capture measurements, and so on. The specific I/O components 2508 that are included in a particular machine will depend on the type of machine. For example, portable machines such as mobile phones may include a touch input device or other such input mechanisms, while a headless server machine will likely not include such a touch input device. It will be appreciated that the I/O components 2508 may include many other components that are not shown in FIG. 25. In various examples, the I/O components 2508 may include user output components 2524 and user input components 2526. The user output components 2524 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 2526 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 2508 may include biometric components 2528, motion components 2530, environmental components 2532, or position components 2534, among a wide array of other components. For example, the biometric components 2528 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The biometric components may include a brain-machine interface (BMI) system that allows communication between the brain and an external device or machine. This may be achieved by recording brain activity data, translating this data into a format that can be understood by a computer, and then using the resulting signals to control the device or machine.

Example types of BMI technologies, including:
Electroencephalography (EEG) based BMIs, which record electrical activity in the brain using electrodes placed on the scalp.
Invasive BMIs, which used electrodes that are surgically implanted into the brain.
Optogenetics BMIs, which use light to control the activity of specific nerve cells in the brain.

Any biometric data collected by the biometric components is captured and stored only with user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the data is not shared or sold to any third party without the explicit consent of the user. In addition, appropriate technical and organizational measures are implemented to ensure the security and confidentiality of this sensitive information.

The motion components 2530 include acceleration sensor components (e.g., accelerometer), gravitation sensor components, rotation sensor components (e.g., gyroscope).

The environmental components 2532 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple cameras systems may include a wide camera, an ultra-wide camera, a telephoto camera, a macro camera, and a depth sensor, for example.

The position components 2534 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2508 further include communication components 2536 operable to couple the machine 2500 to a network 2538 or devices 2540 via respective coupling or connections. For example, the communication components 2536 may include a network interface component or another suitable device to interface with the network 2538. In further examples, the communication components 2536 may include wired communication components, wireless communication components, cellular communication components, Near Field Communication (NFC) components, Bluetooth® components (e.g., Bluetooth® Low Energy), Wi-FiR components, and other communication components to provide communication via other modalities. The devices 2540 may be another machine or any of a wide variety of peripheral devices (e.g., a peripheral device coupled via a USB).

Moreover, the communication components 2536 may detect identifiers or include components operable to detect identifiers. For example, the communication components 2536 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 2536, such as location via Internet Protocol (IP) geolocation, location via Wi-Fi® signal triangulation, location via detecting an NFC beacon signal that may indicate a particular location, and so forth.

The various memories (e.g., main memory 2516, static memory 2518, and memory of the processors 2504) and storage unit 2520 may store one or more sets of instructions and data structures (e.g., software) embodying or used by any one or more of the methodologies or functions described herein. These instructions (e.g., the instructions 2502), when executed by processors 2504, cause various operations to implement the disclosed examples.

The instructions 2502 may be transmitted or received over the network 2538, using a transmission medium, via a network interface device (e.g., a network interface component included in the communication components 2536) and using any one of several well-known transfer protocols (e.g., hypertext transfer protocol (HTTP)). Similarly, the instructions 2502 may be transmitted or received using a transmission medium via a coupling (e.g., a peer-to-peer coupling) to the devices 2540.

Software Architecture

Figure 26:
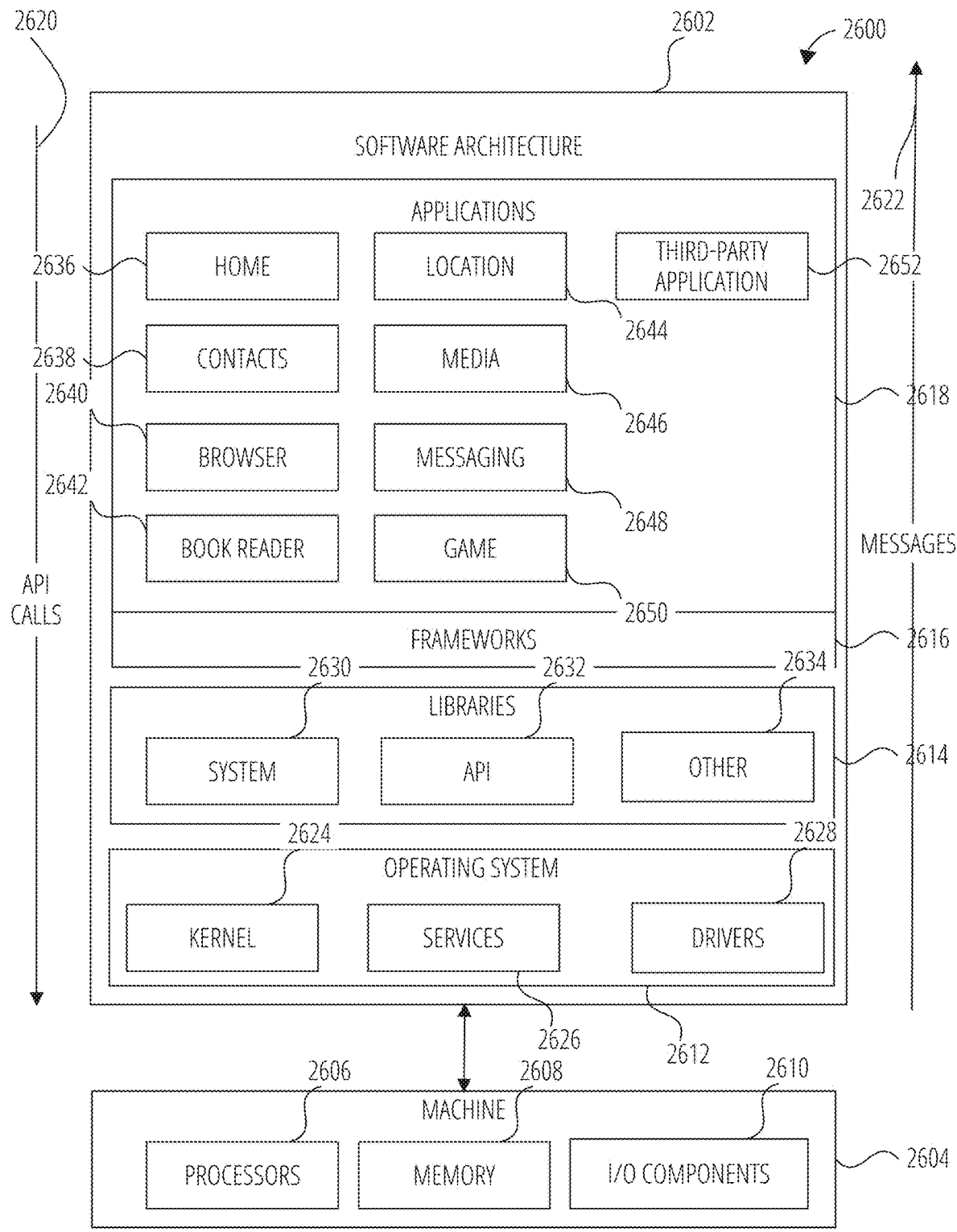
FIG. 26 is a block diagram showing a software architecture within which examples may be implemented.

FIG. 26 is a block diagram 2600 illustrating a software architecture 2602, which can be installed on any one or more of the devices described herein. The software architecture 2602 is supported by hardware such as a machine 2604 that includes processors 2606, memory 2608, and I/O components 2610. In this example, the software architecture 2602 can be conceptualized as a stack of layers, where each layer provides a particular functionality. The software architecture 2602 includes layers such as an operating system 2612, libraries 2614, frameworks 2616, and applications 2618. Operationally, the applications 2618 invoke API calls 2620 through the software stack and receive messages 2622 in response to the API calls 2620.

The operating system 2612 manages hardware resources and provides common services. The operating system 2612 includes, for example, a kernel 2624, services 2626, and drivers 2628. The kernel 2624 acts as an abstraction layer between the hardware and the other software layers. For example, the kernel 2624 provides memory management, processor management (e.g., scheduling), component management, networking, and security settings, among other functionalities. The services 2626 can provide other common services for the other software layers. The drivers 2628 are responsible for controlling or interfacing with the underlying hardware. For instance, the drivers 2628 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 2614 provide a common low-level infrastructure used by the applications 2618. The libraries 2614 can include system libraries 2630 (e.g., C standard library) that provide functions such as memory allocation functions, string manipulation functions, mathematic functions, and the like. In addition, the libraries 2614 can include API libraries 2632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 2614 can also include a wide variety of other libraries 2634 to provide many other APIs to the applications 2618.

The frameworks 2616 provide a common high-level infrastructure that is used by the applications 2618. For example, the frameworks 2616 provide various graphical user interface (GUI) functions, high-level resource management, and high-level location services. The frameworks 2616 can provide a broad spectrum of other APIs that can be used by the applications 2618, some of which may be specific to a particular operating system or platform.

In an example, the applications 2618 may include a home application 2636, a contacts application 2638, a browser application 2640, a book reader application 2642, a location application 2644, a media application 2646, a messaging application 2648, a game application 2650, and a broad assortment of other applications such as a third-party application 2652. The applications 2618 are programs that execute functions defined in the programs. Various programming languages can be employed to create one or more of the applications 2618, structured in a variety of manners, such as object-oriented programming languages (e.g., Objective-C, Java, or C++) or procedural programming languages (e.g., C or assembly language). In a specific example, the third-party application 2652 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 2652 can invoke the API calls 2620 provided by the operating system 2612 to facilitate functionalities described herein.

EXAMPLES

Example 1 is a system comprising: at least one processor; at least one memory component storing instructions that, when executed by the at least one processor, cause the at least one processor to perform operations comprising: storing, in association with each content collection within a plurality of content collections, a set of rules that defines respective first criteria for adding a content item to the content collection, and that defines respective second criteria for viewing the content collection; determining, for a first content collection of the plurality of content collections, that the respective first criteria is met with respect to a first user of a first device; providing, based on determining that the respective first criteria is met, for the first user to generate the content item; adding the generated content item to the first content collection; determining, for the first content collection, that the respective second criteria is met with respect to a second user of a second device; and providing, based on determining that the respective second criteria is met, the first content collection to the second device for viewing by the second user.

In Example 2, the subject matter of Example 1 includes, wherein the respective first criteria specifies a first time period during which the first user is permitted to add the content item to the first content collection.

In Example 3, the subject matter of Example 2 includes, wherein first time period starts at a preset time of night for a given day, and wherein the respective second criteria specifies a second time period during which the second user is permitted to view the first content collection, the second time period starting at a preset time of morning after the given day.

In Example 4, the subject matter of Example 3 includes, wherein the given day is limited to Thursday through Saturday.

In Example 5, the subject matter of Examples 3-4 includes, wherein the respective second criteria limits viewing to users who contributed content to the first content collection.

In Example 6, the subject matter of Examples 2-5 includes, wherein the first time period starts at a preset time of morning for a given day, and wherein the respective second criteria limits viewing of the first content collection by the second user to the first time period on the given day.

In Example 7, the subject matter of Examples 1-6 includes, wherein the respective first criteria specifies a required geolocation of the first device, in order to add the content item to the first content collection.

In Example 8, the subject matter of Examples 1-7 includes, wherein the respective first criteria specifies at least one user profile attribute to be met by the first user, in order to add the content item to the first content collection.

In Example 9, the subject matter of Examples 1-8 includes, wherein the respective first criteria specifies a required type of content to include in the content item, in order to add the content item to the first content collection.

In Example 10, the subject matter of Examples 1-9 includes, wherein the respective second criteria specifies a required geolocation of the second device, in order to view the first content collection.

In Example 11, the subject matter of Examples 1-10 includes, wherein the respective second criteria specifies which users associated the first user are permitted to view the first content collection.

In Example 12, the subject matter of Example 11 includes, wherein the users associated with the first user who are permitted to view the first content collection correspond one of: preselected users directly connected to the first user, all users directly connected to the first user, or all users directly connected to the first user and their direct contacts.

Example 13 is a method comprising: storing, in association with each content collection within a plurality of content collections, a set of rules that defines respective first criteria for adding a content item to the content collection, and that defines respective second criteria for viewing the content collection; determining, for a first content collection of the plurality of content collections, that the respective first criteria is met with respect to a first user of a first device; providing, based on determining that the respective first criteria is met, for the first user to generate the content item; adding the generated content item to the first content collection; determining, for the first content collection, that the respective second criteria is met with respect to a second user of a second device; and providing, based on determining that the respective second criteria is met, the first content collection to the second device for viewing by the second user.

In Example 14, the subject matter of Example 13 includes, wherein the respective first criteria specifies a first time period during which the first user is permitted to add the content item to the first content collection.

In Example 15, the subject matter of Example 14 includes, wherein first time period starts at a preset time of night for a given day, and wherein the respective second criteria specifies a second time period during which the second user is permitted to view the first content collection, the second time period starting at a preset time of morning after the given day.

In Example 16, the subject matter of Example 15 includes, wherein the given day is limited to Thursday through Saturday.

In Example 17, the subject matter of Examples 15-16 includes, wherein the respective second criteria limits viewing to users who contributed content to the first content collection.

In Example 18, the subject matter of Examples 14-17 includes, wherein the first time period starts at a preset time of morning for a given day, and wherein the respective second criteria limits viewing of the first content collection by the second user to the first time period on the given day.

In Example 19, the subject matter of Examples 13-18 includes, wherein the respective first criteria specifies a required geolocation of the first device, in order to add the content item to the first content collection.

Example 20 is a non-transitory computer-readable storage medium storing instructions that, when executed by at least one processor, cause the at least one processor to perform operations comprising: storing, in association with each content collection within a plurality of content collections, a set of rules that defines respective first criteria for adding a content item to the content collection, and that defines respective second criteria for viewing the content collection; determining, for a first content collection of the plurality of content collections, that the respective first criteria is met with respect to a first user of a first device; providing, based on determining that the respective first criteria is met, for the first user to generate the content item; adding the generated content item to the first content collection; determining, for the first content collection, that the respective second criteria is met with respect to a second user of a second device; and providing, based on determining that the respective second criteria is met, the first content collection to the second device for viewing by the second user.

Glossary

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers, for example, to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts perform an action or interaction on the user device, including an interaction with other users or computer systems.

What is claimed is:

1. A system comprising:
   at least one processor;
   at least one memory component storing instructions that, when executed by the at least one processor, cause the at least one processor to perform operations comprising:
   storing, in association with each content collection within a plurality of content collections, a set of rules that defines respective first criteria for adding a content item to the content collection, and that defines respective second criteria for viewing the content collection;
   determining, for a first content collection of the plurality of content collections, that the respective first criteria is met with respect to a first user of a first device;
   updating, based on determining that the respective first criteria is met, a personal profile interface of the first user to include an interface element, the interface element prompting the first user to add the content item to a first content collection of the plurality of content collections, the interface element further indicating other users who have already contributed to the first content collection, and the interface element further indicating when the first content collection becomes available for viewing;
   providing, based on updating the personal profile, for the first user to generate the content item;
   adding the generated content item to the first content collection;
   updating, based on the adding, the interface element to show when the generated content item was added to the first content collection, and to include user-selectable elements for previewing the generated content item and for saving the generated content item,
   wherein the personal profile interface includes personal information of the first user;

determining, for the first content collection, that the respective second criteria is met with respect to plural second users of respective plural second devices;

providing, based on determining that the respective second criteria is met, the first content collection to the respective plural second devices for viewing by the plural second users; and updating, based on providing the first content collection, the interface element to indicate a number of views and a number of content items for the first content collection.

2. The system of claim 1, wherein the respective first criteria specifies a first time period during which the first user is permitted to add the content item to the first content collection.

3. The system of claim 2, wherein the first time period starts at a preset time of night for a given day, and wherein the respective second criteria specifies a second time period during which the plural second users are permitted to view the first content collection, the second time period starting at a preset time of morning after the given day.

4. The system of claim 3, wherein the given day is limited to Thursday through Saturday.

5. The system of claim 2, wherein the first time period starts at a preset time of morning for a given day, and wherein the respective second criteria limits viewing of the first content collection by the plural second users to the first time period on the given day.

6. The system of claim 1, wherein the respective first criteria specifies a required geolocation of the first device, in order to add the content item to the first content collection.

7. The system of claim 1, wherein the respective first criteria specifies at least one user profile attribute to be met by the first user, in order to add the content item to the first content collection.

8. The system of claim 1, wherein the respective first criteria specifies a required type of content to include in the content item, in order to add the content item to the first content collection.

9. The system of claim 1, wherein the respective second criteria specifies a required geolocation of the respective plural second devices, in order to view the first content collection.

10. The system of claim 1, wherein the respective second criteria specifies which users associated the first user are permitted to view the first content collection.

11. The system of claim 10, wherein the users associated with the first user who are permitted to view the first content collection correspond one of: preselected users directly connected to the first user, all users directly connected to the first user, or all users directly connected to the first user and their direct contacts.

12. A method comprising:

storing, in association with each content collection within a plurality of content collections, a set of rules that defines respective first criteria for adding a content item to the content collection, and that defines respective second criteria for viewing the content collection;

determining, for a first content collection of the plurality of content collections, that the respective first criteria is met with respect to a first user of a first device;

providing, based on determining that the respective first criteria is met, for the first user to generate the content item;

adding the generated content item to the first content collection;

updating a personal profile interface of the first user to include an interface element for showing when the generated content item was added to the first content collection, and for indicating when the first content collection becomes is available for viewing, the interface element having user-selectable elements for previewing the generated content item and for saving the generated content item, wherein the personal profile interface includes personal information of the first user, and further includes a user-selectable element to update account settings for the first user, the user-selectable element being selectable to update an avatar of the first user;

determining, for the first content collection, that the respective second criteria is met with respect to plural second users of respective plural second devices; and providing, based on determining that the respective second criteria is met, the first content collection to the respective plural second devices for viewing by the plural second users.

13. The method of claim 12, wherein the respective first criteria specifies a first time period during which the first user is permitted to add the content item to the first content collection.

14. The method of claim 13, wherein first time period starts at a preset time of night for a given day, and wherein the respective second criteria specifies a second time period during which the plural second users are permitted to view the first content collection, the second time period starting at a preset time of morning after the given day.

15. The method of claim 14, wherein the given day is limited to Thursday through Saturday.

16. The method of claim 13, wherein the first time period starts at a preset time of morning for a given day, and wherein the respective second criteria limits viewing of the first content collection by the plural second users to the first time period on the given day.

17. A non-transitory computer-readable storage medium storing instructions that, when executed by at least one processor, cause the at least one processor to perform operations comprising:

storing, in association with each content collection within a plurality of content collections, a set of rules that defines respective first criteria for adding a content item to the content collection, and that defines respective second criteria for viewing the content collection;

determining, for a first content collection of the plurality of content collections, that the respective first criteria is met with respect to a first user of a first device;

providing, based on determining that the respective first criteria is met, for the first user to generate the content item;

adding the generated content item to the first content collection;

updating a personal profile interface of the first user to include an interface element for showing when the generated content item was added to the first content collection, and for indicating when the first content collection becomes is available for viewing, the interface element having user-selectable elements for previewing the generated content item and for saving the generated content item, wherein the personal profile interface includes personal information of the first user, and further includes a user-selectable element to update account settings for the first user, the user-selectable element being selectable to update an avatar of the first user;

determining, for the first content collection, that the respective second criteria is met with respect to plural second users of respective plural second devices; and providing, based on determining that the respective second criteria is met, the first content collection to the respective plural second devices for viewing by the plural second users.

18. The system of claim 1, wherein the interface element includes a thumbnail representing the generated content item, and wherein the thumbnail is depicted with a badge to indicate what time of day the first content collection is available for viewing.

19. The system of claim 1, wherein the personal information of the first user includes a username, contact information and list of contacts of the first user.

20. The system of claim 1, wherein each second user of the plural second users is provided with a different version of the first content collection, based on an allowed list of contacts for the second user, and wherein the respective second criteria limits viewing to only those users who contributed content to the first content collection, such that each second user of the plural second users contributed content to the first content collection.

21. The system of claim 1, wherein the personal profile interface further includes a user-selectable element to update account settings for the first user, the user-selectable element being selectable to update an avatar of the first user.

* * * * *